US005923413A

United States Patent [19]

Laskowski

[11] Patent Number: 5,923,413

[45] Date of Patent: Jul. 13, 1999

[54] UNIVERSAL BANK NOTE DENOMINATOR AND VALIDATOR

[75] Inventor: Edward L. Laskowski, Seven Hills, Ohio

[73] Assignee: Interbold, North Canton, Ohio

[21] Appl. No.: 08/749,260

[22] Filed: Nov. 15, 1996

[51] Int. Cl.[6] .......................... G06K 9/74

[52] U.S. Cl. .......................... 356/71; 356/434; 356/435; 356/444; 356/448

[58] Field of Search .......................... 356/71, 434, 435, 356/444, 448

[56] References Cited

U.S. PATENT DOCUMENTS

| | | |
|---|---|---|
| 4,147,430 | 4/1979 | Gorgone . |
| 4,159,054 | 6/1979 | Yoshida . |
| 4,163,570 | 8/1979 | Greenaway . |
| 4,176,783 | 12/1979 | Eppich . |
| 4,179,685 | 12/1979 | O'Maley . |
| 4,183,665 | 1/1980 | Iannandrea . |
| 4,187,463 | 2/1980 | Kivenson . |
| 4,204,765 | 5/1980 | Iannandrea . |
| 4,211,918 | 7/1980 | Nyfeler . |
| 4,234,844 | 11/1980 | Yuki . |
| 4,255,057 | 3/1981 | Williams . |
| 4,255,652 | 3/1981 | Weber . |
| 4,277,774 | 7/1981 | Fujii . |
| 4,283,708 | 8/1981 | Lee . |
| 4,288,781 | 9/1981 | Sellner . |
| 4,302,781 | 11/1981 | Ikeda . |
| 4,309,602 | 1/1982 | Gonsalves . |
| 4,311,914 | 1/1982 | Huber . |
| 4,319,137 | 3/1982 | Nakamura . |
| 4,348,656 | 9/1982 | Gorgone . |
| 4,349,111 | 9/1982 | Shah . |
| 4,352,988 | 10/1982 | Ishida . |
| 4,355,300 | 10/1982 | Weber . |
| 4,383,275 | 5/1983 | Sasaki . |
| 4,386,432 | 5/1983 | Nakamura . |
| 4,399,553 | 8/1983 | Toyama . |
| 4,429,991 | 2/1984 | Williams . |
| 4,435,834 | 3/1984 | Pauli . |
| 4,442,541 | 4/1984 | Finkel . |
| 4,461,028 | 7/1984 | Okubo . |
| 4,464,786 | 8/1984 | Nishito . |
| 4,464,787 | 8/1984 | Fish . |
| 4,472,627 | 9/1984 | Weinberger . |
| 4,482,058 | 11/1984 | Steiner . |

(List continued on next page.)

*Primary Examiner*—David C. Nelms
*Assistant Examiner*—Reginald A. Ratliff
*Attorney, Agent, or Firm*—Ralph E. Jocke

[57] ABSTRACT

An apparatus and method for providing an indication of a type of note passing through the apparatus includes a note transport (12) which moves the note past transversely spaced spot sensing assemblies (18). Each spot sensing assembly includes four emitters (32). Each of the emitters produces radiation at a different wavelength. The spot sensing assemblies include a reflectance detector (20) and a transmission detector (22) which are disposed on opposed sides of the passing note. The emitters direct radiation onto test spots (34) on the passing note. The emitters in each assembly are activated individually and repeatedly in a sequence. Radiation reflected from each type of emitter to the reflectance detector at each test spot causes a control circuit (24) to generate reflectance values. Radiation transmitted from each emitter through each test spot to the transmission detector causes the control circuit to generate transmission values. The control circuit produces a sensed value set including the reflectance and transmission values from each of the emitters in each of the spot sensing assemblies. The control circuit also determines an angle of skew of the passing note. The control circuit is in connection with a data store which includes memories (138). Each of the memories includes data representative of templates of values corresponding to transmission and reflectance values for known note types in a number of note positions. The control circuit generates stored value sets from the templates and skew angle. The control circuit further calculates a value representative of a level of correlation between the sensed value set and each of the stored value sets. The control circuit determines the highest level of correlation between all the stored value sets which is indicative of the note type.

77 Claims, 10 Drawing Sheets

U.S. PATENT DOCUMENTS

| | | |
|---|---|---|
| 4,486,098 | 12/1984 | Buchegger . |
| 4,487,306 | 12/1984 | Nao . |
| 4,490,846 | 12/1984 | Ishida . |
| 4,500,002 | 2/1985 | Koshio . |
| 4,501,439 | 2/1985 | Antes . |
| 4,504,084 | 3/1985 | Jauch . |
| 4,513,439 | 4/1985 | Gorgone . |
| 4,514,085 | 4/1985 | Kaye . |
| 4,524,276 | 6/1985 | Ohtombe . |
| 4,537,504 | 8/1985 | Baltes . |
| 4,538,791 | 9/1985 | Gray . |
| 4,539,702 | 9/1985 | Oka . |
| 4,542,829 | 9/1985 | Emery . |
| 4,546,869 | 10/1985 | Dean . |
| 4,550,433 | 10/1985 | Takahashi . |
| 4,556,140 | 12/1985 | Okada . |
| 4,558,224 | 12/1985 | Gober . |
| 4,563,771 | 1/1986 | Gorgone . |
| 4,572,349 | 2/1986 | Furuya . |
| 4,584,529 | 4/1986 | Aoyama . |
| 4,587,412 | 5/1986 | Apisdorf . |
| 4,587,434 | 5/1986 | Roes . |
| 4,588,292 | 5/1986 | Collins . |
| 4,591,799 | 5/1986 | Faillon . |
| 4,592,090 | 5/1986 | Curl . |
| 4,618,257 | 10/1986 | Bayne . |
| 4,628,194 | 12/1986 | Dobbins . |
| 4,645,936 | 2/1987 | Gorgone . |
| 4,652,015 | 3/1987 | Crane . |
| 4,653,647 | 3/1987 | Hashimoto . |
| 4,659,112 | 4/1987 | Reiner . |
| 4,660,705 | 4/1987 | Kai . |
| 4,677,682 | 6/1987 | Miyagawa . |
| 4,678,072 | 7/1987 | Kobayashi . |
| 4,700,368 | 10/1987 | Munn . |
| 4,731,663 | 3/1988 | Kovalchick . |
| 4,733,308 | 3/1988 | Nakamura . |
| 4,749,074 | 6/1988 | Ueki . |
| 4,749,087 | 6/1988 | Buttifant . |
| 4,754,862 | 7/1988 | Rawicz-Szczerbo . |
| 4,761,205 | 8/1988 | Crane . |
| 4,794,585 | 12/1988 | Lee . |
| 4,809,837 | 3/1989 | Hayashi . |
| 4,823,393 | 4/1989 | Kawakami . |
| 4,827,531 | 5/1989 | Milford . |
| 4,834,230 | 5/1989 | Kondo . |
| 4,837,840 | 6/1989 | Goldman . |
| 4,850,468 | 7/1989 | Kobayashi . |
| 4,858,744 | 8/1989 | Dolejs . |
| 4,864,238 | 9/1989 | Seitz . |
| 4,880,096 | 11/1989 | Kobayashi . |
| 4,881,268 | 11/1989 | Uchida . |
| 4,884,671 | 12/1989 | Gardellini . |
| 4,896,901 | 1/1990 | Ekelund . |
| 4,906,829 | 3/1990 | Iseli . |
| 4,908,516 | 3/1990 | West . |
| 4,922,109 | 5/1990 | Bercovitz . |
| 4,947,441 | 8/1990 | Hara . |
| 4,966,304 | 10/1990 | Kelly . |
| 4,973,851 | 11/1990 | Lee . |
| 4,980,569 | 12/1990 | Crane . |
| 4,996,604 | 2/1991 | Ogawa . |
| 5,004,327 | 4/1991 | Rosen . |
| 5,007,520 | 4/1991 | Harris . |
| 5,010,243 | 4/1991 | Fukushima . |
| 5,027,415 | 6/1991 | Hara . |
| 5,034,616 | 7/1991 | Bercovitz . |
| 5,044,707 | 9/1991 | Mallik . |
| 5,047,871 | 9/1991 | Meyer . |
| 5,063,163 | 11/1991 | Carmeli . |
| 5,068,519 | 11/1991 | Bryce . |
| 5,076,441 | 12/1991 | Gerlier . |
| 5,099,975 | 3/1992 | Ullman . |
| 5,101,184 | 3/1992 | Antes . |
| 5,122,754 | 6/1992 | Gotaas . |
| 5,151,607 | 9/1992 | Crane . |
| 5,167,313 | 12/1992 | Dobbins . |
| 5,199,543 | 4/1993 | Kamagami . |
| 5,201,395 | 4/1993 | Takizawa . |
| 5,210,398 | 5/1993 | Metlitsky . |
| 5,222,584 | 6/1993 | Zouzoulas . |
| 5,231,462 | 7/1993 | Dschen . |
| 5,237,164 | 8/1993 | Takada . |
| 5,242,041 | 9/1993 | Isobe . |
| 5,259,490 | 11/1993 | Gardellini . |
| 5,260,582 | 11/1993 | Danek . |
| 5,267,753 | 12/1993 | Chock . |
| 5,276,396 | 1/1994 | Seitz . |
| 5,279,403 | 1/1994 | Harbaugh . |
| 5,280,333 | 1/1994 | Wunderer . |
| 5,283,422 | 2/1994 | Storch . |
| 5,295,196 | 3/1994 | Raterman . |
| 5,301,786 | 4/1994 | Yoshihara . |
| 5,304,813 | 4/1994 | De Man . |
| 5,308,992 | 5/1994 | Crane . |
| 5,315,511 | 5/1994 | Matsuura . |
| 5,330,041 | 7/1994 | Dobbins . |
| 5,367,577 | 11/1994 | Gotaas . |
| 5,374,825 | 12/1994 | Doty . |
| 5,377,805 | 1/1995 | Ono . |
| 5,381,019 | 1/1995 | Sato . |
| 5,390,003 | 2/1995 | Yamaguchi . |
| 5,393,556 | 2/1995 | Romano . |
| 5,394,969 | 3/1995 | Harbaugh . |
| 5,399,874 | 3/1995 | Gonsalves . |
| 5,405,131 | 4/1995 | Zouzoulos . |
| 5,407,191 | 4/1995 | Ukai . |
| 5,411,249 | 5/1995 | Zouzoulas . |
| 5,411,436 | 5/1995 | Kaplan . |
| 5,416,307 | 5/1995 | Danek . |
| 5,417,316 | 5/1995 | Harbaugh . |
| 5,419,423 | 5/1995 | Ishida . |
| 5,419,424 | 5/1995 | Harbaugh . |
| 5,420,406 | 5/1995 | Izawa . |
| 5,421,443 | 6/1995 | Hatamachi . |
| 5,427,036 | 6/1995 | Fee . |
| 5,427,462 | 6/1995 | Jackson . |
| 5,430,664 | 7/1995 | Cargill . |
| 5,432,506 | 7/1995 | Chapman . |
| 5,434,427 | 7/1995 | Crane . |
| 5,437,357 | 8/1995 | Ota . |
| 5,437,897 | 8/1995 | Tanaka . |
| 5,438,403 | 8/1995 | Hoshino . |
| 5,443,144 | 8/1995 | Dobbins . |
| 5,450,937 | 9/1995 | Ono . |
| 5,462,149 | 10/1995 | Waine . |
| 5,467,405 | 11/1995 | Raterman . |
| 5,467,406 | 11/1995 | Graves . |
| 5,468,971 | 11/1995 | Ebstein . |
| 5,476,169 | 12/1995 | Takarada . |

94

| SCAN # | GREEN REFL | | | RED REFL | | | BLUE REFL | | | IR REFL | | | GREEN TRANS | | | RED TRANS | | | BLUE TRANS | | | IR TRANS | | |
|---|---|---|---|---|---|---|---|---|---|---|---|---|---|---|---|---|---|---|---|---|---|---|---|---|
| | L | C | R | L | C | R | L | C | R | L | C | R | L | C | R | L | C | R | L | C | R | L | C | R |
| 1 | X | X | X | X | X | X | X | X | X | X | X | X | X | X | X | X | X | X | X | X | X | X | X | X |
| 2 | X | X | X | X | X | X | X | X | X | X | X | X | X | X | X | X | X | X | X | X | X | X | X | X |
| 3 | X | X | X | X | X | X | X | X | X | X | X | X | X | X | X | X | X | X | X | X | X | X | X | X |
| 4 | X | X | X | X | X | X | X | X | X | X | X | X | X | X | X | X | X | X | X | X | X | X | X | X |
| 5 | X | X | X | X | X | X | X | X | X | X | X | X | X | X | X | X | X | X | X | X | X | X | X | X |
| 6 | X | X | X | X | X | X | X | X | X | X | X | X | X | X | X | X | X | X | X | X | X | X | X | X |
| 7 | X | X | X | X | X | X | X | X | X | X | X | X | X | X | X | X | X | X | X | X | X | X | X | X |
| 8 | X | X | X | X | X | X | X | X | X | X | X | X | X | X | X | X | X | X | X | X | X | X | X | X |
| 9 | X | X | X | X | X | X | X | X | X | X | X | X | X | X | X | X | X | X | X | X | X | X | X | X |
| 10 | X | X | X | X | X | X | X | X | X | X | X | X | X | X | X | X | X | X | X | X | X | X | X | X |
| 11 | X | X | X | X | X | X | X | X | X | X | X | X | X | X | X | X | X | X | X | X | X | X | X | X |
| 12 | X | X | X | X | X | X | X | X | X | X | X | X | X | X | X | X | X | X | X | X | X | X | X | X |
| 13 | X | X | X | X | X | X | X | X | X | X | X | X | X | X | X | X | X | X | X | X | X | X | X | X |
| 14 | X | X | X | X | X | X | X | X | X | X | X | X | X | X | X | X | X | X | X | X | X | X | X | X |
| 15 | X | X | X | X | X | X | X | X | X | X | X | X | X | X | X | X | X | X | X | X | X | X | X | X |
| 16 | X | X | X | X | X | X | X | X | X | X | X | X | X | X | X | X | X | X | X | X | X | X | X | X |
| 17 | X | X | X | X | X | X | X | X | X | X | X | X | X | X | X | X | X | X | X | X | X | X | X | X |
| 18 | X | X | X | X | X | X | X | X | X | X | X | X | X | X | X | X | X | X | X | X | X | X | X | X |
| 19 | X | X | X | X | X | X | X | X | X | X | X | X | X | X | X | X | X | X | X | X | X | X | X | X |
| 20 | X | X | X | X | X | X | X | X | X | X | X | X | X | X | X | X | X | X | X | X | X | X | X | X |
| 21 | X | X | X | X | X | X | X | X | X | X | X | X | X | X | X | X | X | X | X | X | X | X | X | X |
| 22 | X | X | X | X | X | X | X | X | X | X | X | X | X | X | X | X | X | X | X | X | X | X | X | X |
| 23 | X | X | X | X | X | X | X | X | X | X | X | X | X | X | X | X | X | X | X | X | X | X | X | X |
| 24 | X | X | X | X | X | X | X | X | X | X | X | X | X | X | X | X | X | X | X | X | X | X | X | X |
| 25 | X | X | X | X | X | X | X | X | X | X | X | X | X | X | X | X | X | X | X | X | X | X | X | X |
| 26 | X | X | X | X | X | X | X | X | X | X | X | X | X | X | X | X | X | X | X | X | X | X | X | X |
| 27 | X | X | X | X | X | X | X | X | X | X | X | X | X | X | X | X | X | X | X | X | X | X | X | X |
| 28 | X | X | X | X | X | X | X | X | X | X | X | X | X | X | X | X | X | X | X | X | X | X | X | X |
| 29 | X | X | X | X | X | X | X | X | X | X | X | X | X | X | X | X | X | X | X | X | X | X | X | X |

X = SENSOR VALUE

FIG. 10

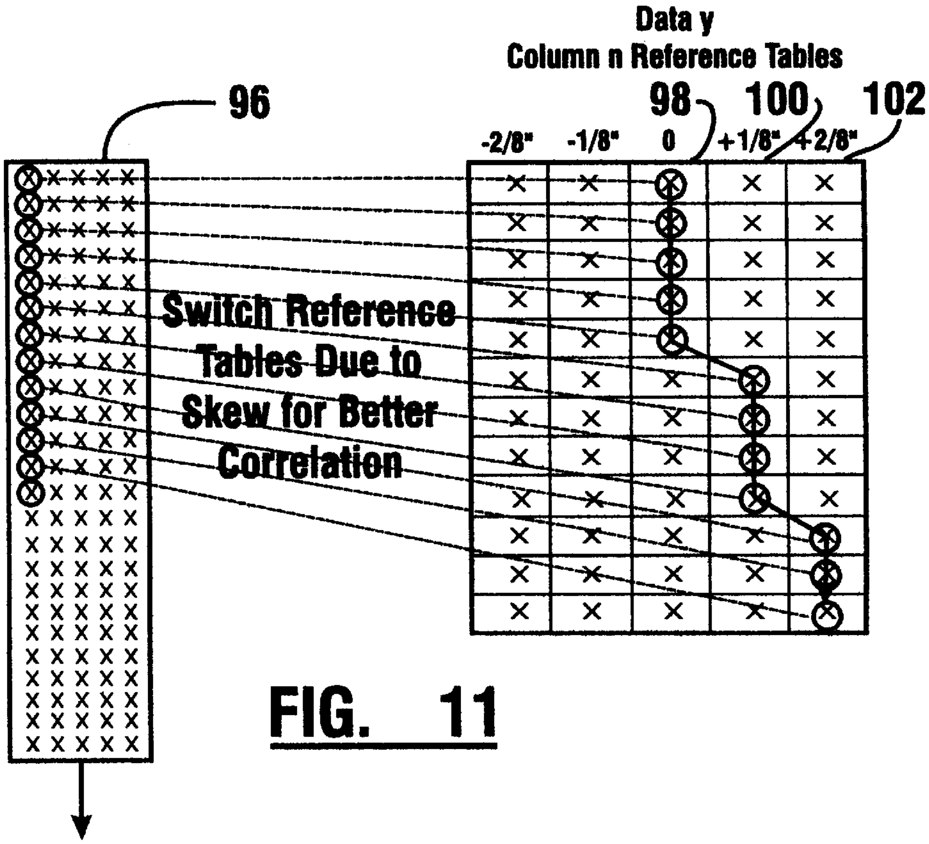

FIG. 11

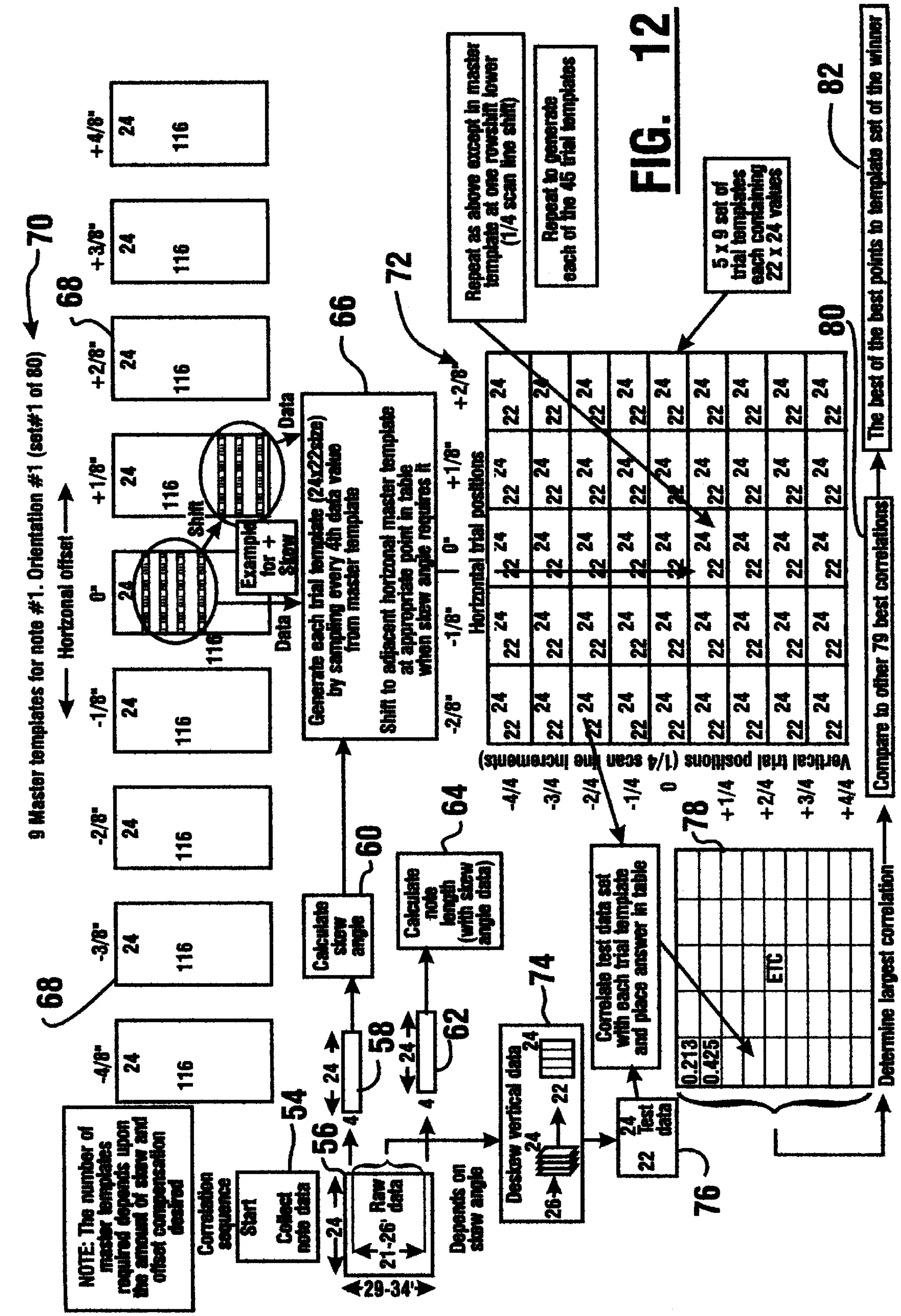
9 Master templates for note #1. Orientation #1 (set#1 of 80)
70
Horizonal offset
-4/8"
-3/8"
-2/8"
-1/8"
0"
+1/8"
+2/8"
+3/8"
+4/8"
24
116
68
Example for + Skew
Shift
Data
NOTE: The number of master templates required depends upon the amount of skew and offset compensation desired
Correlation sequence
Start
Collect note data
54
56
Raw data
21-26'
29-34'
24
58
4
Calculate skew angle
60
Calculate note length (with skew angle data)
64
62
Depends on skew angle
Deskew vertical data
26
22
74
Generate each trial template (24x22size) by sampling every 4th data value from master template
Shift to adjacent horizonal master template at appropriate point in table when skew angle requires it
66
72
Horizontal trial positions
Vertical trial positions (1/4 scan line increments)
-4/4
-3/4
-2/4
-1/4
0
+1/4
+2/4
+3/4
+4/4
Repeat as above except in master template at one rowshift lower (1/4 scan line shift)
Repeat to generate each of the 45 trial templates
5 x 9 set of trial templates each containing 22 x 24 values
FIG. 12
Correlate test data set with each trial template and place answer in table
Test data
76
78
0.213
0.425
ETC
Determine largest correlation
Compare to other 79 best correlations
80
The best of the best points to template set of the winner
82

UNIVERSAL BANK NOTE DENOMINATOR AND VALIDATOR

TECHNICAL FIELD

This invention relates to devices for identifying the type and validity of documents. Specifically this invention relates to a device for identifying the denomination and authenticity of currency notes.

BACKGROUND ART

Numerous devices have been previously developed for identifying documents and determining their authenticity. Likewise, devices have been previously developed for determining the denomination and authenticity of bank and currency notes. Such devices commonly test different properties of a presented note and based on the properties sensed, give an indication of the denomination and/or authenticity of the presented note. All such prior art devices have limitations.

Many prior art devices require precise alignment of the note during sensing of its properties. This requires the device to include a mechanism to align the notes and often limits the speed at which the notes can be processed. In addition, some devices require that presented notes be oriented in a particular way as they are sensed. This limits their usefulness as notes are often not presented in a uniform orientation.

Many prior art devices for determining note denomination and validity are capable of processing only a small number of note types. This presents drawbacks as other note types cannot be processed. Such prior art devices are also generally made to be used with only one type of currency such as the currency of a particular country. Often it is difficult or impossibl e to adapt such devices to handle currencies of countries which have different physical properties. Furthermore, it may be difficult to adapt such devices to a new printing series of notes within the same country.

Many prior art devices are also amenable to compromise by counterfeit notes. It is becoming easier to produce highly a ccur ate counterfeit reproductions of currency. By mimicking the properties of a note that are tested by prior art currency denominators and validaters, it is often possible to have counterfeit notes accepted.

To minimize the risk of acceptance of counterfeits, the range of the acceptance criteria in prior art devices can often be set more closely. However, currency notes in circulation change properties through use fairly quickly. Notes in circulation may change their properties through handling and wear. Notes may become dirty or marked with ink or other substances. Notes may also lose their color due to having been mistakenly washed with clothing or exposed to water or sun lght . Prior art currency denominators and validaters may reject valid notes which exhibit such properties when the criteria for acceptance is set too tightly.

Note denominators and validaters currently available may also be difficult to program and calibrate. Such devices, particularly if they must have the capability of handling more than one type of note, may require significant effort to set up and program. In addition, such devices may require initial calibration and frequent periodic recalibration and adjustment to maintain a suitable level of accuracy.

Prior art note denominators and validaters, particularly those having greater capabilities, often occupy significant physical space. This limits where they may be installed. In addition, such devices also often have a relatively high cost which limits their suitability for particular uses and applications.

Thus, there exists a need for a currency note denominator and validater which is more accurate, has greater capabilities, is faster, smaller in size, and lower in cost.

DISCLOSURE OF INVENTION

It is an object of the present invention to provide an apparatus that indicates the identity of a note.

It is a further object of the present invention to provide an apparatus that indicates the identity of a note, that operates rapidly.

It is a further object of the present invention to provide an apparatus that indicates the identity of a note, that does not require that the note have a particular alignment or orientation.

It is a further object of the present invention to provide an apparatus that indicates the identity of a note, that identifies notes exhibiting a variety of wear and aging conditions.

It is a further object of the present invention to provide an apparatus that indicates the identity of a note, that is capable of handling a wide variety of sizes and types of currency notes.

It is a further object of the present invention to provide an apparatus that indicates the identity of a note, that may be readily set up for operation.

It is a further object of the present invention to provide an apparatus that indicates the identity of a note, that is compact in size.

It is a further object of the present invention to provide an apparatus that indicates the identity of a note, that is economical to use and manufacture.

It is a further object of the present invention to provide an apparatus that indicates the identity of a note, that is reliable.

It is a further object of the present invention to provide a method for identifying a type associated with a note.

It is a further object of the present invention to provide a method for identifying a type associated with a note, that is accurate.

It is a further object of the present invention to provide a method for identifying a note, that is capable of identifying notes having various wear and aging conditions.

It is a further object of the present invention to provide a method for identifying a note, which can be used with a wide variety of notes of various orientations.

It is a further object of the present invention to provide a method for identifying notes, that can be performed rapidly by a control circuit.

It is a further object of the present invention to provide a method for identifying a note, that can be used to identify notes that are not consistently aligned or in a particular orientation.

Further objects of the present invention will be made apparent in the following Best Modes for Carrying Out Invention and the appended claims.

The foregoing objects are accomplished in a preferred embodiment of the invention by an apparatus and method for providing an indication of the type of a note. The apparatus is preferably used for providing signals indicative of a denomination of a currency note. This apparatus may also provide an indication of note orientation and/or note authenticity.

The invention is preferably used in connection with a transport for moving notes. A plurality of spaced spot sensing assemblies are disposed transversely to a direction of note movement in the transport. In a preferred form of the invention, three spot sensing assemblies are used, although other embodiments of the invention may include other numbers of such assemblies.

Each assembly includes a radiation source which comprises a plurality of emitters. Each emitter generates radiation at a different wavelength. In the preferred form of the invention four emitters are used. The emitters generally span the range of visible light as well as infrared. In the preferred form of the invention the emitters include in each assembly red, green, blue and infrared emitters. Each of the emitters in an assembly is aimed to illuminate a spot on a passing note.

Each spot sensing assembly includes a first detector. The first detector is positioned on a first side of the note as it passes in the transport. The first detector is preferably positioned in centered relation with respect to the emitters. The first detector senses radiation from the emitters reflected from the test spots on the note.

Each assembly also includes a second detector. The second detector is positioned on a second side of the note opposite the first detector. The second detector detects radiation from each emitter that passes through the test spots on the note.

The apparatus of the invention includes a circuit in operative connection with a data store. The circuit is operable to actuate each of the emitters in each spot sensing assembly in a sequence. In accordance with one form of the invention the sequence all of the emitters of the same type produce radiation simultaneously while all of the other types of emitters are off. Alternatively, the sequence may provide for emitters in the spot sensing assemblies to be turned on at different times. However, in the preferred embodiment only one emitter in each spot sensing assembly is active at any one time while the sensors are being read. The emitters are preferably activated in the sequence continuously.

The emitters are sequenced numerous times as the note in the transport passes adjacent to the spot sensing assemblies. As a result, three sets of test spots arranged in a line are sensed on each passing note.

For each test spot, the first detector which senses reflection produces a first signal responsive to each emitter. Each first signal is representative of the amount of radiation reflected from the test spot from a corresponding emitter. Likewise, the second detector produces second signals responsive to the amount of light transmitted through the test spot on the note from each emitter.

The circuit is operative to receive the first and second signals from the first and second detectors respectively, and to generate reflectance and tranmission values in response thereto. For each test spot four reflectance and four transmission values are generated. Likewise, for each row of three test spots which are checked on the note simultaneously by the three spot sensing assemblies, twelve reflectance values and twelve tranmission values are generated. In the preferred form of the invention generally about 29 rows of test spots are sensed as the note moves past the spot sensing assemblies. This results in the circuit generating about 348 reflective values and 348 transmission values per note.

The values in the data store correspond to reflectance and tranmission values for a number of note types in various orientations and spatial positions. The circuit is operative to generate stored value sets from the values in the data store. Stored value sets are generated based on the angle of skew of the note, which is detected as it passes the sensing assemblies. Numerous stored value sets are generated by the circuit, each corresponding to a particular note, denomination, note orientation, and note position.

The circuit is operative to calculate values representative of the levels of correlation between the sensed value set of reflectance and transmission values for the note, and each of the stored value sets. By comparing the level of correlation between the sensed value set and the stored value sets, a highest correlation value is determined. The highest level of correlation will be with a stored value set that corresponds to the particular denomination and orientation of the note which passed through the transport to produce the sensed value set. The circuit is operative to generate a signal indicative of the note type it identifies.

In the preferred form of the invention the circuit is operative to compare the highest correlation value with a set threshold value. Even worn notes and those that have been subject to abuse exhibit a relatively high level of correlation with a stored value set for the correct note type. If however, the level of correlation is not above the set threshold, then the note may not be identifiable, or it may be a counterfeit or it may be identified and determined to be unfit for reuse. The circuit generates signals indicative of these conditions.

BRIEF DESCRIPTION OF THE DRAWINGS

FIG. 10 is a tabular representation of the data shown in FIG. 9 shifted for purposes of calculating a value representative of a level of correlation.

FIG. 11 is a schematic representation demonstrating how sensed value data from a skewed note is correlated with data stored in the data store of the invention.

FIG. 12 is a schematic representation showing the steps in the correlation sequence carried out in the preferred embodiment of the present invention.

BEST MODES FOR CARRYING OUT INVENTION

Figure 1:
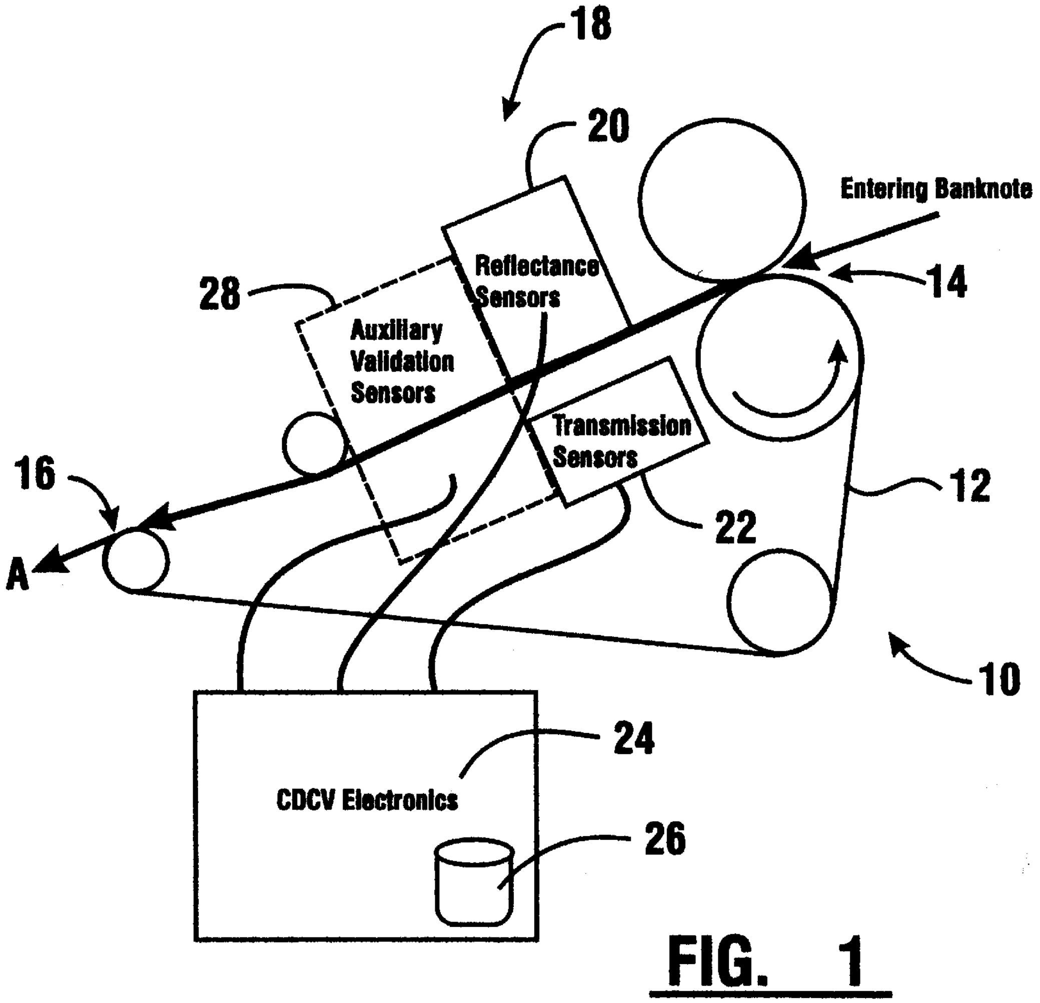
FIG. 1 is a schematic of a preferred embodiment of the apparatus for identifying notes of the present invention.

Referring now to the drawings and particularly to FIG. 1, there is shown therein a preferred embodiment of an apparatus of the present invention generally indicated 10. The apparatus includes a note transport 12. Transport 12 is preferably a belt-type transport that moves sheets such as currency notes one at a time from an entry end 14 to an exit end 16. Sheets such as notes move on the transport 12 in a note direction indicated by Arrow A.

The apparatus of the present invention also includes a plurality of spot sensing assemblies 18. The preferred form of the invention includes three spot sensing assemblies which are spaced from one another in a direction transverse of the note direction of note movement (see FIG. 3).

Each of the spot sensing assemblies includes a reflectance detector, schematically indicated 20. Each spot sensing assembly 18 also includes a transmission detector schematically indicated 22. As indicated in FIG. 1 the reflectance detector 20 is in operative connection with, and outputs first signals to, a control circuit schematically indicated 24. The transmission detectors 22 are also in operative connection with the control circuit 24, and the transmission detectors output second signals thereto. Control circuit 24 is also in operative connection with a data store schematically indicated 26 which holds stored values in a manner later explained.

The apparatus of the present invention may in certain embodiments also include auxiliary validation sensors schematically indicated 28. The auxiliary sensors 28 preferably detect properties of passing notes that are not detected by the spot sensing assemblies. These auxiliary sensors may include, for example, magnetic type sensors or sensors for sensing identification strips on passing notes or sheets. The auxiliary sensors 28 do not form part of the present invention and are not further discussed herein. It will be understood however, that many types of auxiliary sensors may be used in connection with the present invention and the signals output by such sensors are processed and analyzed in the control circuit 24 through appropriate electronic components.

Figure 2:
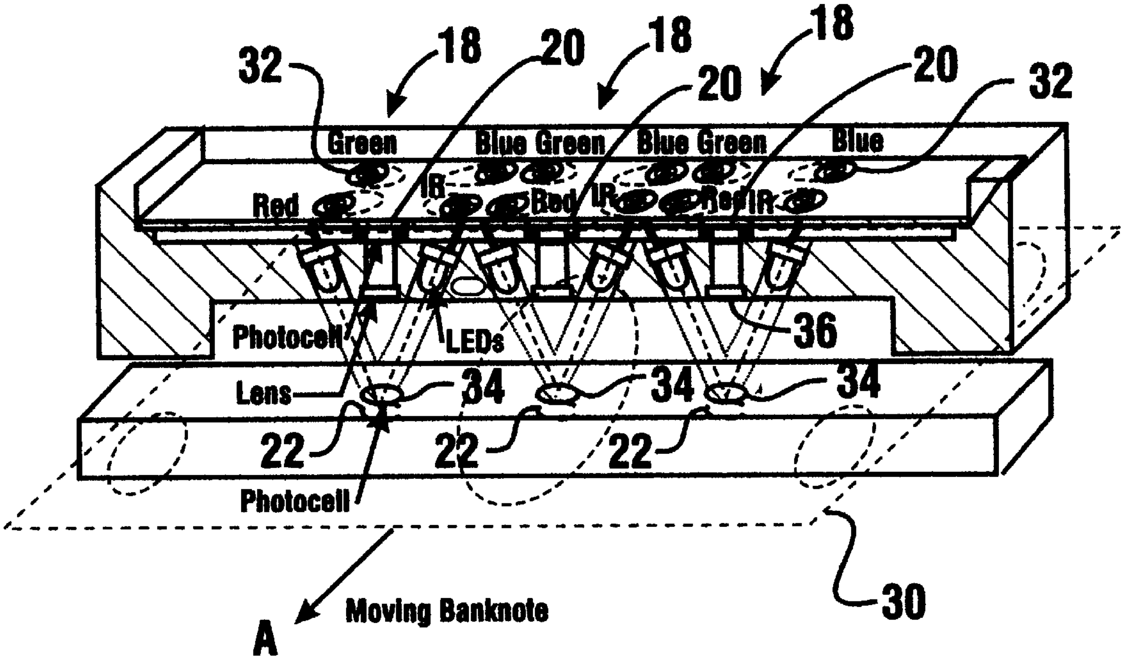
FIG. 2 is an isometric schematic view of three spot sensing assemblies sensing test spots on a moving note.
Figure 3:
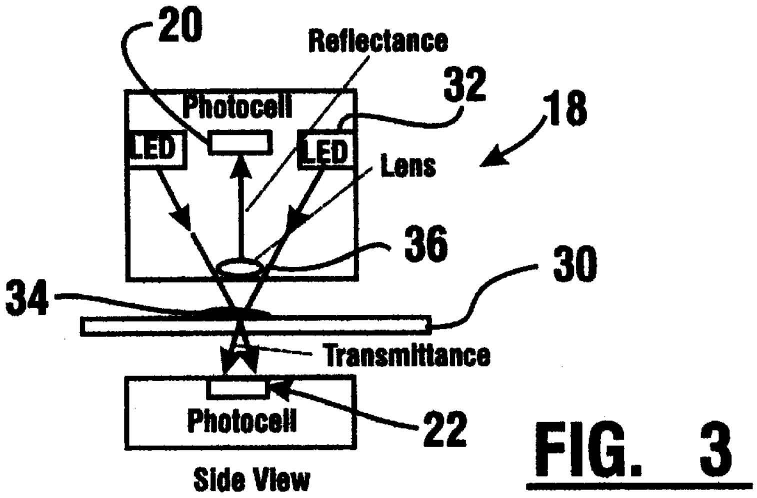
FIG. 3 is a schematic view of a spot sensing assembly.

The spot sensing assemblies 18 are shown in greater detail in FIGS. 2 and 3. Each spot sensing assembly includes a reflectance detector 20, which in the preferred form of the invention includes a photocell. The reflectance detectors 20 are positioned on a first side of a passing note 30 which is shown in phantom in FIG. 2. The transport 12 moves note 30 past the spot sensing assemblies.

Each spot sensing assembly 18 includes four emitters 32. The emitters 32 are positioned generally adjacent to, and in surrounding relation of, each reflectance detector 20. Each spot sensing assembly includes emitters with wavelengths which generally span the visible range of light and infrared. In the described embodiment each spot sensing assembly includes a blue emitter, a green emitter, a red emitter, and an infrared emitter. In the preferred form of the invention, the emitters are light emitting diodes (LEDs) which are selectively operable to produce generally monochromatic light at a particular wavelength. In other embodiments of the invention other types and wavelengths of emitters may be used.

Each emitter 32 in a spot sensing assembly is oriented so as to direct and focus radiation onto a test spot schematically indicated 34, which is shown on the adjacent surface of a passing note. In the preferred form of the invention, because there are three spot sensing assemblies, properties of the note are sampled simultaneously at three test spots 34 which are transversely spaced across the bill. As best shown in FIG. 3, radiation from the emitters 32 is reflected from each test spot 34 to the reflectance sensor 20 of the spot sensing assembly. The reflected light is passed through a lens 36 adjacent to each reflectance detector to further focus the reflected light thereon.

Radiation from the emitters 32 also passes through each test spot on the test note. The transmitted radiation passes to the transmission detector 22 of each of the spot sensing assemblies 18. In the preferred form of the invention each of the transmission detectors 22 includes a photocell. As a result, when reflectance detector 20 senses radiation from one of the emitters reflected from the test note, transmission detector 22 simultaneously senses radiation transmitted through the test note from the same emitter.

In the preferred form of the invention the control circuit 24 is operable to selectively actuate each of the emitters 32. The control circuit actuates each type emitter in each spot sensing assembly individually, so that only one emitter in a spot sensing assembly is producing radiation at any time.

In one embodiment, the control circuit 24 is operative to activate the same type emitter in each of the spot sensing assemblies 18 simultaneously. For example, all the blue emitters in each of the spot sensing assemblies are activated to produce radiation at the same time. Thereafter, all the blue emitters go off and all the green emitters in each of the spot sensing assemblies come on. Thereafter, the green emitters go off and the red emitters come on. When the red emitters go off the infrared emitters come on. The infrared emitters go off and the sequence repeats. Alternatively, the emitters may be activated in a "marquee" style so that the particular type emitter in each assembly is on for a time before it is read, and emitters of the same type are read at different times. This approach has the advantage that it enables the emitters to stabilize before being read by the controller. Of course, the sequence of emitters may be different in other embodiments.

The emitters radiate individually and in sequence rapidly such that each emitter comes on one time for each test spot 34. The test spots preferably are discrete and each of the emitters direct light onto generally the same spot on the note during one sequence despite the fact that the note is moving.

As those skilled in the art will appreciate from the foregoing description, each reflectance detector 20 produces four first signals for each test spot 34. The four first signals are produced responsive to radiation from the blue, green, red, and infrared emitters respectively. Similarly, each transmission detector 22 produces four second signals for each test spot 34. There is one second signal for the radiation transmitted through the test spot from each of the four emitters in the spot sensing assembly.

The control circuit 24 receives each of these first signals and is operative to generate a reflectance value responsive to each signal representative of the magnitude of light reflected by the note 30 from each of the emitters. Likewise, the control circuit 24 is operative to generate transmission values responsive to each of the four second signals from transmission detector 22. Each of the transmission values are representative of transmitted light through the test spot from each emitter. Because there are three spot sensing assemblies 18 spaced transversely across the note, the first circuit is operative to generate 12 reflectance values and 12 transmission values for each row of 3 test spots 34 on the note.

In the preferred form of the invention, the control circuit 24 is operative to actuate the emitters in the spot sensing assemblies very rapidly. This is done so the test spots are maintained discrete and compact. A number of test spots are preferably sensed as a note moves past the three spot sensing assemblies 18 in the transport. In the preferred form of the invention, the spot sensing assemblies are actuated so that each spot sensing assembly senses about 29 test spots on a standard U.S. currency note. This means that generally (29×3=87) test spots are sensed on the average note. Because 4 transmission and 4 reflectance values are generated per test spot (87×8=696), about 696 data values per note are gathered.

The transport 12 is preferably moved in such a speed that 15 standard U.S. currency notes per second are moved past the spot sensing assemblies. Of course, in other embodiments different numbers of test spots, data values and note speeds may be used.

A fundamental advantage of the present invention is that the emitters produce radiation which spans the visible range of light as well as infrared. This provides signals which test the validity of the note at a number of different wavelengths in both the transmission and reflectance modes. This enables the gathering of much more data concerning the note image and material properties than prior types of note denominators and validaters.

A further fundamental advantage of the present invention is that it is capable of identifying many types of notes in different orientations. As later explained, the preferred form of the present invention does not require that the notes be precisely aligned either in the note direction, or transversely in the note path.

Figure 4:
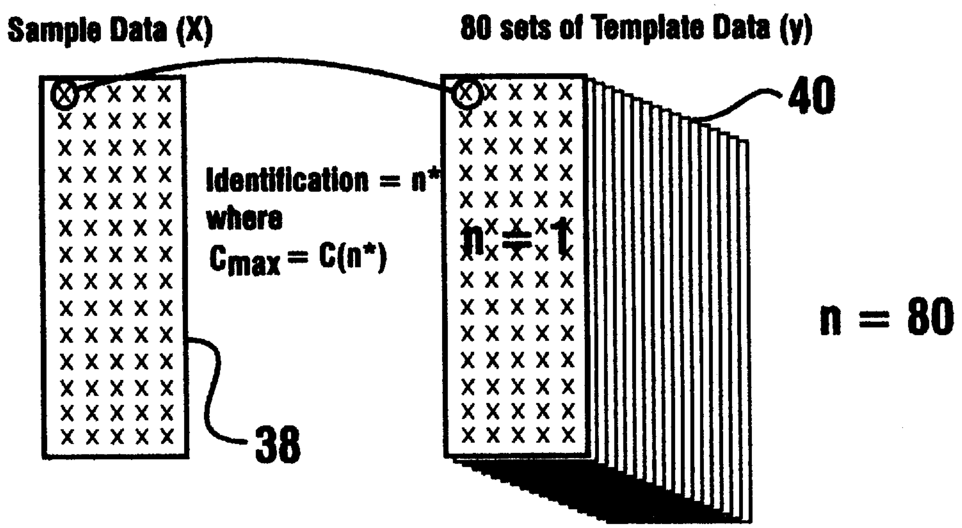
FIG. 4 is a schematic representation demonstrating how a set of sensed data values from a test note is correlated with previously stored value sets for a plurality of note denominations and orientations in the operation of the apparatus of the present invention.

As schematically represented in FIG. 4, a note which is delivered to the present invention for identification and validation may be one of many types. The preferred form of the invention is configured to identify 20 different denominations of notes. Of course, other embodiments of the invention may analyze different numbers of note denominations. However, in the preferred form of the present invention, there is no requirement that the notes delivered be oriented a particular way. Therefore, notes may be delivered face up, face down, as well as with the top of the note leading, or with the bottom of the note leading. To identify the note as a particular type, the present invention must be able to handle notes delivered in all four orientations.

In FIG. 4, a sensed value set 38, representative of a set of data sensed from the test note is shown. As previously discussed, in the preferred embodiment, this sensed value set will generally include a set that is 24 by 29. This is because each row of three test spots generates 24 values (12 reflectance and 12 transmission) and there are generally 29 rows of test spots on the note.

The right side of FIG. 4 shows stored value sets 40. In the preferred form of the invention, the stored value sets are produced by the control circuit 24. The sensed value set 38 generated from the note is compared for correlation with each of the stored value sets 40. In FIG. 4, 80 stored value sets are shown. This is representative of the 20 note denominations multiplied by four possible orientations for each note type.

As will be later explained in detail, in the preferred form of the invention, there are many more than 80 stored value sets to which the sensed value set is compared. This is because the apparatus must determine not only the particular note type (from among 80 possible note types and orientations), but must also determine the note type even though the note position may be shifted either in the direction in which the note is transported or transverse to the note direction, or may be skewed relative to the direction of transport.

Figure 5:
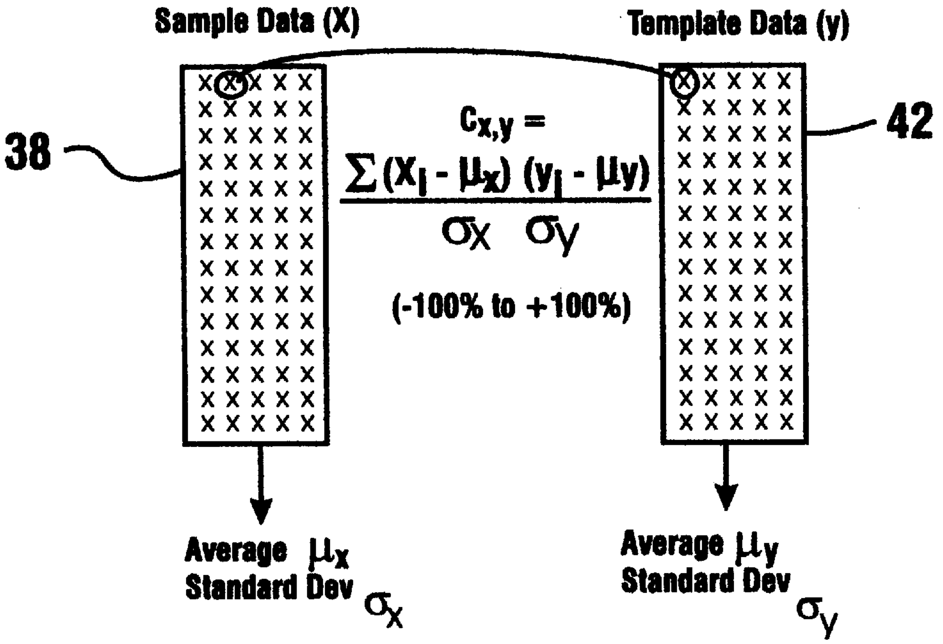
FIG. 5 is a schematic representation demonstrating the calculation of a value representative of a level of correlation between a set of sensed data values and a stored data value set for a particular note type.

The process by which the control circuit calculates the values representation of the level of correlation between the sensed valued set (which is representative of the reflectance and transmission values from the sensed note) and the stored value sets, is schematically represented in FIG. 5. For purposes of the correlation calculation carried out by the control circuit 24, the sensed value set 38 is considered to be (x) data. The data values in the stored value set indicated 42 are considered to be (y) data. The level of correlation is 10 calculated in accordance with the equation:

$$C_{xy} = \frac{\sum (x_i - \mu_x)(y_i - \mu_y)}{\sigma_x \sigma_y}$$

where:

$C_{xy}$ is the correlation coefficient.

$x_i$ is the sensed value from the sensed value set data.

$y_i$ is the corresponding value in the stored value set.

$\mu_x$ is the average of the values in the portion of the sensed value set being correlated.

$\mu_y$ is the average of the values in the corresponding portion of the stored value set being correlated.

$\sigma_x$ is the standard deviation of the sensed values in the portion of the sensed value set being correlated.

$\sigma_y$ is the standard deviation in the corresponding portion of the stored value set.

As will be appreciated, the greater the correlation coefficient the higher the level of correlation between the sensed value set and the stored value set being compared. A high value is indicative that the stored value set corresponds to the particular type test note that generates the data in the sensed value set.

Figure 6:
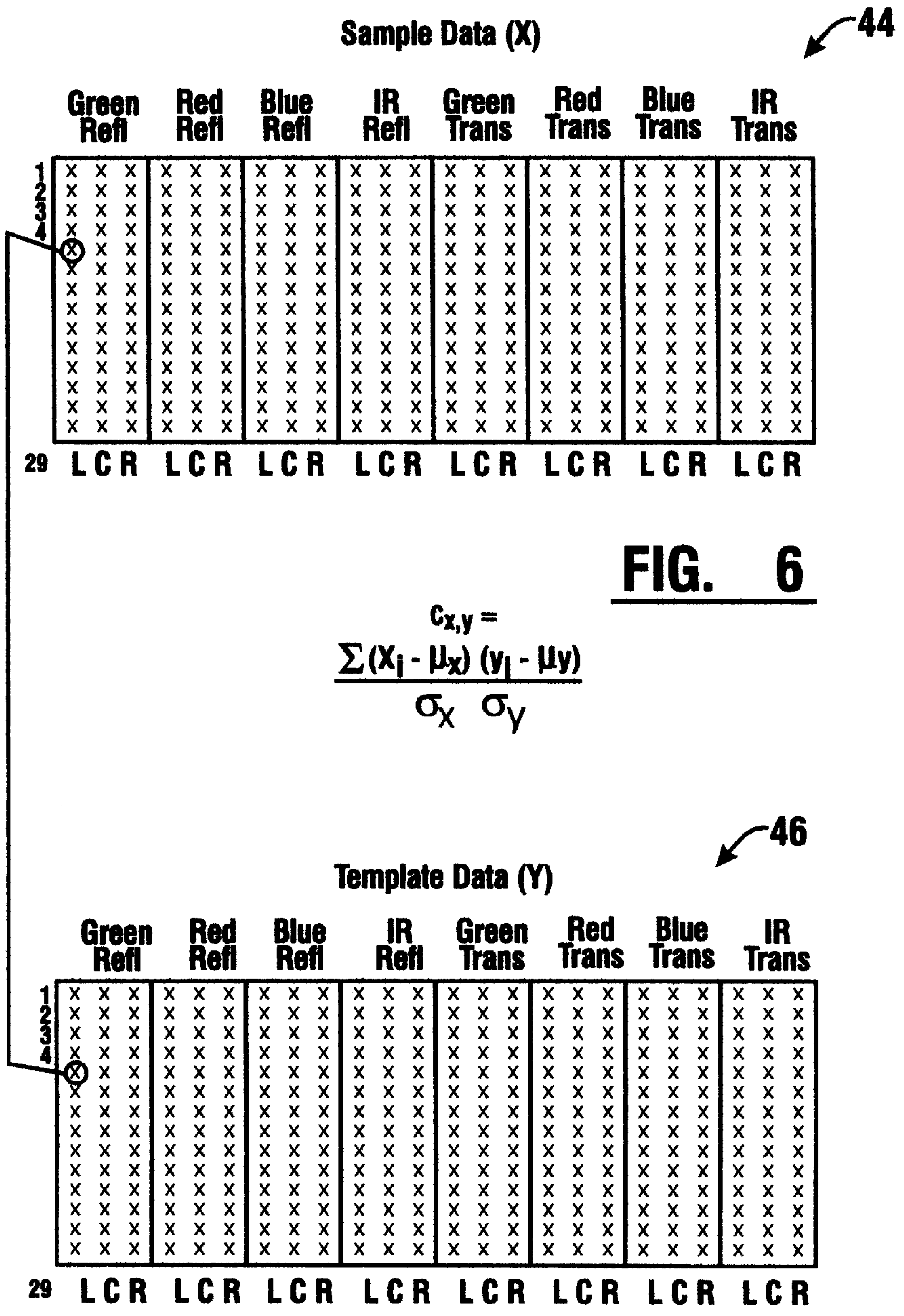
FIG. 6 is a schematic representation of data sensed from three spot sensing assemblies and the calculation of a value representative of a level of correlation between the sensed value set and a stored value set.

Turning now to FIG. 6 there is schematically shown a sensed value set 44 from a note that is moved past spot sensing assemblies 18. As shown in the upper portion of FIG. 6, sensed value set 44 is a matrix that is 24 by 29. The lower portion of FIG. 6 shows a similarly sized stored value set 46 which is generated by circuit 24 from data in the data store 26 in a manner later explained.

In the preferred form of the invention each set comprising the three columns of “x” values representing one color and mode in sensed value set 44 is checked for correlation with corresponding values in the three columns of stored value set 46. A correlation coefficient is calculated for the values in each triple column set. The correlation coefficients for each of the 8 triple column sets are then multiplied together by the control circuit to obtain an overall correlation value indicative of a level of correlation between the sensed value set and the stored value set.

In one form of the invention the correlation coefficient values for reflectance mode values are first multiplied together to obtain an overall correlation value for reflectance. Thereafter the same is done for all correlation coefficient values for transmission mode values to obtain an overall value for transmission. These overall values are then multiplied together to calculate a fmal value indicative of correlation of the stored value set and the test note.

Calculating the transmission and reflectance values separately has the advantage that the individual values can be analyzed individually by the control circuit in accordance with its programming. This may be preferred in some embodiments. For example, high correlation for overall reflectance but not transmission may be indicative of some quality of the note that may warrant taking it out of circulation.

Other embodiments may combine correlation values in other ways, such as by wavelength or radiation. The combination of correlation values for analysis may differ in other embodiments depending on the notes and properties of interest. The present invention, because the stored value sets generated are arranged in matrices, can analyze certain physical areas on notes in detail through programming of the control circuit. Thus in embodiments of the invention the manner in which sensed and stored value sets are generated and correlation values calculated may be tailored to note properties and areas of interest.

The particular type of note passing through the apparatus of the invention, is generally indicated by the stored value set having the highest overall level of correlation with the sensed value set. This stored value set corresponds to one note type, for example, a particular note denomination in a particular orientation. Once the control circuit determines the stored value set with the highest level of correlation, it then indicates the particular type of note that it has determined the passing note to be by generating a signal indicative thereof.

In some embodiments it is also desirable to point out situations where the passing note has a relatively low level of correlation with all of the possible note types. This may be indicative of a counterfeit note, a foreign note or currency that is unacceptable for reuse due to tears, dirt, wear, or extraneous markings. The control circuit 24 is operable to provide an indication not only of the identity of the note type which best correlates with the sensed value set, but also to indicate when the calculated highest level of correlation is below a set threshold which suggests a counterfeit or unacceptable note.

Alternatively, the control circuit of the apparatus of the present invention may be configured to include several set thresholds for correlation. These may correspond to notes which are suspect as counterfeit or severely damaged, and notes which merely exhibit signs of wear, age or abuse which make them unacceptable for return to circulation. Because the preferred form of the present invention provides data which accurately identifies notes by denomination despite wear, dirt and extraneous markings, it is possible to make such judgments concerning the quality of a note as well as to identify its type.

The present invention also provides data which may be used advantageously specifically for counterfeit detection purposes. The ability of the invention to test both transmission and reflectance across a broad spectrum of radiation, and to compare sensed data to stored values for proper notes, enables the setting of thresholds for particular wavelengths of radiation. Some wavelengths of radiation may provide data more indicative than others of counterfeit or unacceptable notes. This is particularly true in countries which have currency notes that include different color schemes for different denominations. The control circuit of the present invention may be programmed to abstract and analyze particular abstracted correlation data for this purpose.

While in the embodiment of the invention previously described, correlation coefficients are calculated for sets which correspond to 3 columns of data and these correlation coefficients are then combined, other embodiments may use sets comprised of other portions of the sensed data for purposes of calculating the correlation coefficients. These correlation coefficients may then be combined to produce a final value indicative of correlation with the stored value data. For example, correlation values may be calculated between each column or line of sensed data and stored data. These correlation values may then be combined. Alternatively, correlation values based on 12 columns associated with each mode (transmission/reflectance) may be calculated and then the 2 values combined. Alternatively, a single correlation value for all data in the sensed and stored value sets may be calculated. The approach of calculating correlation coefficients for 3 columns of data and then combining them as described has been found to work well for U.S. currency. However, for other types of notes or documents, or for other forms of sensing hardware, other approaches to calculating correlation coefficients and then combining them, may also be found to work well in indicating the identity of the test note or document.

Referring again to FIG. 6, it should be noted that in the embodiment of the invention shown that generally the first four rows of sensed data and generally the last three rows of such data, are not correlated with the stored value sets when the bill is transversely aligned in the note path. Generally, the calculation of the level of correlation is made between sensed value sets and stored value sets comprising 22 rows and 24 columns. As later explained, the first four rows of data sensed from the note and the last at least three rows, are generally used to calculate whether the note is skewed in the transverse direction of the bill path as well as to confirm that the note is the proper length. If the note is skewed the control circuit generates stored value sets by selecting values from the data store which are correspondingly transposed to correspond to the calculated angle of skew. Further, as can be appreciated by those skilled in the art, if a note is "longer" than a proper note, such that it produces data for more test spots than it should, it is identified as a suspect or counterfeit note by the control circuit and is rejected or treated accordingly.

In the preferred embodiment of the invention, notes passing the spot sensing assemblies on the transport need not be aligned either in the note direction or in a transverse direction to be identified. To achieve this, the data store includes data for all of the identifiable note types at a much closer spacing than the spacing between test spots detected by the spot sensing assemblies as a note passes. In the preferred form of the invention, the data is collected and stored for increments that are one-fourth the spacing between the test spots on a note passing in the transport. Of course, in other embodiments of the invention other increments may be used.

Figure 7:
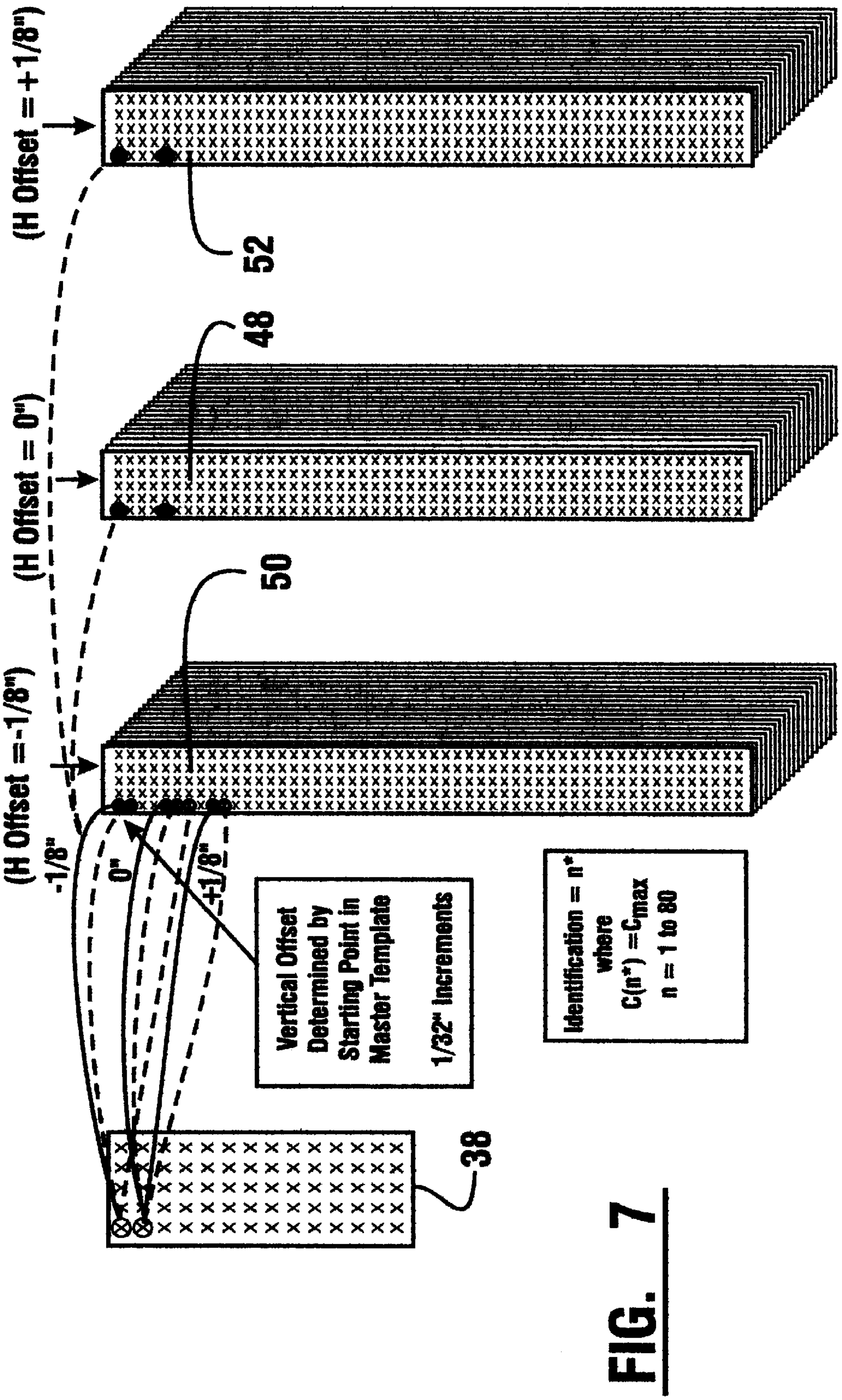
FIG. 7 is a schematic representation of values stored in a data store of the preferred embodiment of the invention, and how this data is correlated with a sensed value set.

In FIG. 7 a sensed value set 38 is schematically represented. A first template 48 is representative of a particular type of note denomination that passes in centered relation relative to the 3 spot sensing assemblies in the transport. As a result, it is indicated in FIG. 7 as having a "0" offset. The values shown in first template 48 are the 24 transmission and reflectance values for a note of a particular type at increments one-fourth the distance between the test spots on a passing note. Thus, in the preferred embodiment, first template 48 would be a matrix of 24 by (29×4) 116 values.

Stored value sets for comparison to a sensed value set are derived from template 48 by the control circuit by taking the values in every fourth line from the template. In other words, the data in lines 1, 5, 9, 13, and so on, correspond to a note in a particular position relative to the direction a note moves in the transport. Similarly, lines 2, 6, 10, 14, and so on correspond to the same type of note in another position relative to the note direction.

From the template 48, the control circuit generates stored value sets corresponding to the particular note type to which template 48 corresponds in varied positions relative to the note transport direction.

In FIG. 7, second template 50 corresponds to the same note type as note 48. Second template 50, however, has reflectance and transmission values for test spots on the note offset a transverse increment from the test spots which produced the values in first template 48. By taking every fourth line of values from template 50 the control circuit generates stored value sets for the particular type of note, transversely offset from the centered position and in various positions relative to the direction of note transport.

Third template 52 shown in FIG. 7 corresponds to the same type of note as templates 48 and 50. Template 52 contains values corresponding to test spots on the note shifted transversely from the zero offset position in an opposed direction from template 50. Third template 52 is also a matrix of 24 by 116 values. Stored value sets are produced therefrom by the control circuit by abstracting every fourth line of values.

In the preferred embodiment of the invention, templates are provided for test spots at several transversely offset positions. This enables notes to be disposed from the centerline of the note path, as well to have a leading edge that is not aligned with any reference, and still be identified.

The process of inputting the data necessary to produce the templates is accomplished in the preferred embodiment during a set up mode of the apparatus. In the set up mode, stored value data is generated by positioning a note of each type in the transport. Data is gathered by each spot sensing assembly from 116 lines of test spots instead of the 29 lines which is the usual number for a sensed note. This can be accomplished by static positioning of the note or, alternatively, by moving the note at a speed which enables the spot sensing assemblies to be sequenced sufficient times to gather the data for storage in the data store.

During the set up mode, the notes are sensed while centered in the transport path as well as disposed transversely from the centered or "zero offset" position, so that the templates for notes that are transversely offset in increments are generated and stored. The ability to set up the device by using actual currency and passing it through the transport enables set up of forms of the apparatus in a rapid and reliable fashion. This is desirable where this data must be gathered for twenty notes, each of which has four orientations and several offset positions.

In one embodiment of the invention, templates are produced for four offset positions in each transverse direction from the zero offset position. These templates are offset in increments of one-eighth of an inch. This means that a note passing through the transport may be positioned within one half inch in either transverse direction of the zero offset position and still be accurately identified.

In other embodiments of the invention it is feasible to gather and/or compute the stored values experimentally and store them in templates in the data store. Alternatively, such templates may be produced in a separate machine and then loaded into the data store of the apparatus. Provided the data is accurately gathered, the apparatus will properly indicate the type of note sensed.

The process by which the apparatus of the present invention calculates a level of correlation and determines the identity of a note is schematically represented in FIG. 12. It should be understood that in the operation of apparatus 10 the control circuit 24 actuates the emitters of each of the spot sensing assemblies 18 in the sequence on a continuing basis. A note can arrive at any point during the sequence. As the note moves adjacent to and then passes the three spot sensing assemblies 18, the control circuit gathers the data at a step 54. The data gathered is arranged in memory as a matrix of values that is generally 24 by 29. This raw data is represented by matrix 56. Matrix 56 may actually contain more values if the note is skewed. However, for purposes of this initial example, a 24 by 29 matrix will be assumed which corresponds with a non-skewed note.

As represented by 4 by 24 submatrix 58, the first four rows of data from the note are used by the control circuit to calculate a skew angle at a step 60 in a manner hereinafter discussed. Further, as represented by the 4 by 24 submatrix 62, control circuit 24 is operable to calculate the note length at a step 64. In doing this, the control circuit considers the skew angle, because the spot sensing assemblies will sense more than 29 rows of test spots on a note if the note is skewed. At step 64 the length of the note is determined based on the number of test spots from which data is received, and the skew angle. The note length is compared to a stored value indicative of the number of test spots for a standard note length, and if the note is "too long" or "too short" control circuit 24 generates a signal indicative of the condition sensed.

Assuming for purposes of this example that the note is the correct length and transversely aligned with respect to the note path, the control circuit 24 is operative at a step 66 to generate stored value sets. The stored value sets are generated from templates 68. The nine templates 68 shown are each a matrix of 24 columns by 116 rows. The nine templates 68 comprise a master template 70 which corresponds to a note type (one note denomination in a particular orientation). Each of the nine templates 68 correspond to the note type in each of nine transverse positions in the note path. The 116 rows of data in each template 68 represent the transmission and reflectance values in increments one-fourth the distance between test spots on a sensed note that is passed through the transport.

In the embodiment of the invention described, the nine 24 by 116 templates 68 comprise the master template 70 which includes all the stored values corresponding to one note type. Because the preferred form of the invention is configured to identify twenty notes in four orientations, there are eighty master templates in the data store in this preferred embodiment. Each of the master templates is comprised of nine templates, like templates 68. This means that in this preferred embodiment the data store holds (80×9=720) templates, each template having (24×116–2784) data values, for a total of (720×2784=2,004,480) stored values in the data store. Of course in other embodiments other template arrangements may be used.

The control circuit 24 is operative in the example shown to produce forty-five stored value sets 72 from the templates 68 in each master template 70. These forty-five stored value sets are shown in a table in FIG. 12. These stored value sets 72 are generated by the control circuit by taking every fourth line from each of the templates 68. The control circuit preferably does this starting with the sixteenth line in each of the templates 68. This is done because, as previously discussed, the first four rows of data taken from the note are used to calculate skew angle, and are generally not used in generating the stored value sets 72 if the note is not skewed. Forty-five stored value sets 72 are generated for each of the eighty templates 70.

As can be appreciated from the foregoing discussion, with the first four rows of test spots being discarded, the first row of test spots on the note from which the data would be used for correlation purposes in this example would be the fifth row of test spots. This corresponds to the (4×5) twentieth line in each template 68. Thus the control circuit takes the twentieth line and every fourth line thereafter until 22 rows of data are read to generate a 22 by 24 stored value set 72. Stored value sets produced in this manner correspond to the "zero vertical position" in the table in FIG. 12.

However, because the note sensed may be shifted forward in the note path from the zero position, the control circuit 24 is operative to generate stored value sets 72 that are likewise shifted forward in the note direction. This is done by starting with the nineteenth line in each template 78 and taking every fourth line thereafter until 22 values are gathered. This corresponds a shift forward one increment. Stored value sets generated in this manner are the −1/4 stored value sets 72 shown in FIG. 12.

Likewise, stored value sets shifted two increments forward are generated starting with the eighteenth line of data in each of the templates 68 and taking every fourth line thereafter. This corresponds to the −2/4 stored value sets 72 shown in the table in FIG. 12.

As can be appreciated, stored value sets are also generated starting with the seventeenth line in each template 68. These correspond to the −3/4 stored value sets 72. Stored value sets starting with the sixteenth line correspond to the −4/4 stored value sets 72 in the table in FIG. 12.

The note may also be shifted rearwards from the "zero vertical position". As a result, stored value sets 72 are produced starting with the twenty-first, twenty-second, twenty-third, and twenty-fourth values in each of the templates 68. These correspond to the +1/4, +2/4, +3/4, and +4/4 vertical position stored value sets respectively shown in FIG. 12.

Stored value sets 72 are further generated for transverse offset positions. As shown in FIG. 12 stored value sets are produced for transverse offset positions of −1/8", −2/8", +1/8" and +2/8". Thus, the 45 stored value sets 72 represent reflectance and transmission values for one note type shifted forward and backwards in the direction the note moves in the transport, as well as in both transverse directions.

While the master templates 70 consist of nine transverse sub-templates 68, in the preferred form of the invention, stored value sets 72 are only produced for five transverse positions of the note, rather than nine. This is because the transport of the preferred embodiment and the manner in which the notes are delivered, generally maintain the notes within a quarter inch of the zero offset position. For this reason in the preferred embodiment, it is not necessary to produce additional stored value sets. However, in alternative embodiments where the transverse position of the note may be further disposed from the zero offset position, additional stored value sets may be generated by the control circuit and used for correlation with the sensed value sets.

Referring again to FIG. 12, the matrix of raw values 56 from a test note that is sensed undergoes a vertical de-skewing step 74 performed by the control circuit 24 when the note is sensed as skewed, as later explained. When the note is not skewed as in this example, step 74 has no effect on the raw data. In the present example, a sensed value set 76 which is a 24 by 22 matrix is produced by the control circuit 24 directly from the raw data.

The control circuit 24 is then operative to calculate the level of correlation between the sensed value set 76 and each of the stored value sets 72 in the manner discussed with reference to FIG. 6. Each of the correlation values is calculated and temporarily stored by the control circuit, which storage is represented by table 78. From all the correlation values calculated for each master template, one value will generally be the highest. Of course, there are eighty master templates and the control circuit is operative to find the highest level of correlation among the forty-five values for each of the 80 master templates. This is represented by a step 80 in FIG. 12. The control circuit is then operative at a step 82 to provide an indication of the identity of the note type that produced the highest correlation value and therefore most closely correlates with the sensed value set from the note that passed through the apparatus.

As previously discussed, embodiments of the invention also have stored in connection with the control circuit a threshold value which the highest level of correlation calculated must exceed before a note is considered genuine. If the highest level of correlation for all the stored value sets does not exceed this threshold level, then the note is suspect and potentially a counterfeit. Suspect notes of this type may be returned to a customer or held within the apparatus in a designated location. This is done by using a divert mechanism that transports notes to the designated location.

Alternative embodiments of the invention may also be used to segregate notes that are considered in good condition from those that exhibit wear, abuse or soiled conditions. This is accomplished by having stored in connection with the control circuit 24 a further threshold value for correlation which is above the threshold for note genuineness, but below that for notes in suitable condition. Such an intermediate threshold may be used for purposes of segregating bank notes that, while still good, are sufficiently worn or soiled such that they should be removed from circulation.

A further advantage of the present invention is that it may provide an indication of note type that includes note orientation. This enables the present invention to be coupled with mechanisms which reorient the note and segregate notes of different denominations. This enables the notes to be collected for bundling or for dispense to a user of the machine in which the apparatus of the present invention is installed.

The present invention also provides capabilities for detecting counterfeit notes. This is achieved because the available data may be selectively processed by the control circuit in ways that are intended to assist in the detection of counterfeit notes. If, for example, it is known that counterfeit currency for a particular country tends to deviate significantly from actual currency either in reflection or transmission of a particular wavelength of radiation, or in a particular region of a note, the level of correlation for this particular wavelength or region of the note may be analyzed by the control circuit individually. Notes which exhibit the properties of a counterfeit may then be identified as suspect even through the overall level of correlation may be marginally acceptable. The particular properties which may distinguish a counterfeit note from a genuine note will depend on a particular currency or other document involved and its properties.

Figure 8:
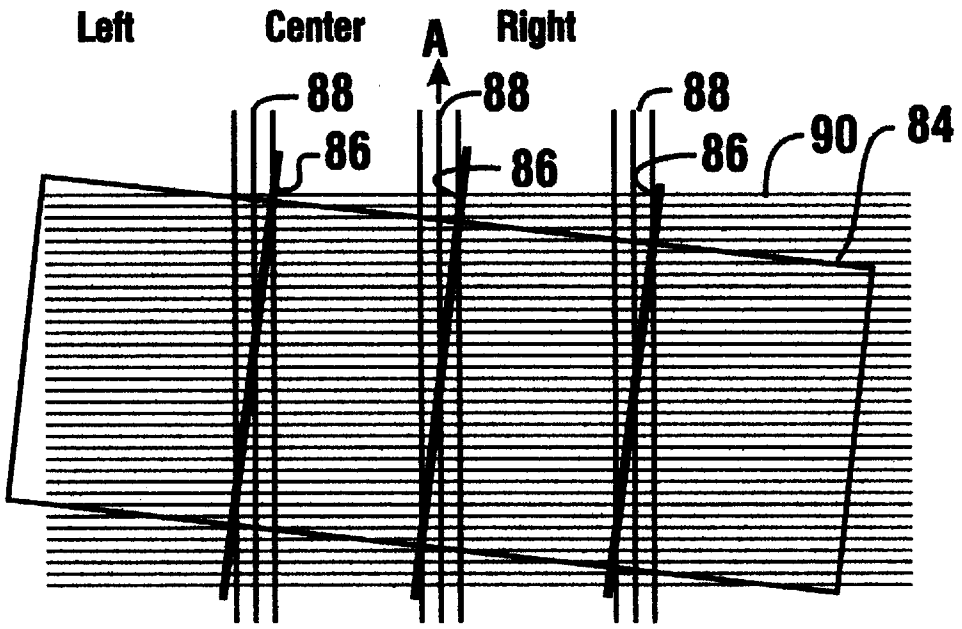
FIG. 8 is a schematic view of a note passing through the apparatus of the present invention in a skewed condition.

A further advantage of the preferred embodiment of the present invention is that notes passing through the apparatus need not be aligned transversely in the note path. Rather, the notes may be skewed such that one of the transverse sides is ahead of the other. An example of a note 84 that is skewed relative to the note path is shown schematically in FIG. 8. Note 84 is shown. with its left side leading. Lines 86 which are superimposed on the note in FIG. 8 show the lines or grid of test spots that would be sampled if the note were aligned in the note path. Lines 88 represent the lines of test spots on the skewed note that are tested by the spot sensing assemblies. Superimposed lines 90 represent where the spot sensing assemblies sense data. Therefore, the intersections of lines 90 and 88 represent a grid of locations where data is gathered by the spot sensing assemblies as the note 84 passes.

Figure 9:
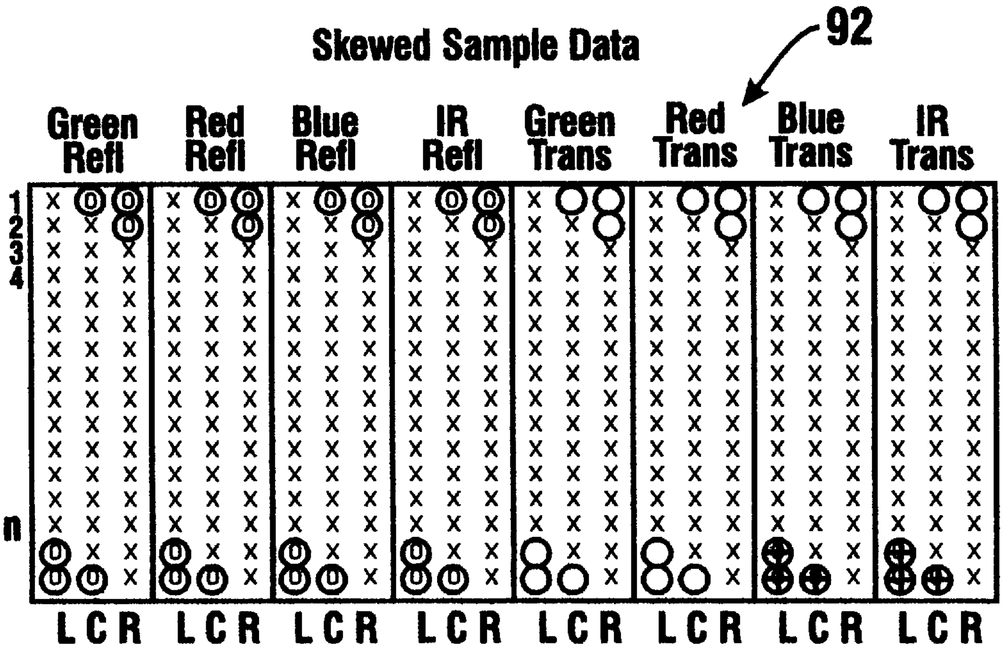
FIG. 9 is a schematic representation of data generated by the circuit of the invention responsive to signals from the spot sensing assemblies for the skewed note shown in FIG. 8.

A sensed value set 92 shown in FIG. 9 shows the matrix of raw data that is generated as note 84 passes the spot sensing assemblies. The spot sensing assembly that is positioned toward the left in FIG. 8 begins sensing data from the note before the spot sensing assembly in the center. Further, the spot sensing assembly in the center begins sensing data before the spot sensing assembly on the right. The spot sensing assemblies that do not sense the note sense a near zero reflectance value and a large transmission value. Similarly, at the trailing portion of the note which is shown by the bottom of the raw sensed value set 92, the spot sensing assemblies stop sensing the note at different times in a manner that is essentially a mirror image of the condition at the leading edge of the note. As can be appreciated from FIG. 8, because of the skewed character of the note, the spot sensing assemblies sense data for more than 29 of the transverse lines 90. It will be recalled that 29 rows of test spots were sensed in the prior example for a non-skewed note.

To analyze this data, the control circuit 24 of the apparatus of the present invention is operable to modify the raw sensed value set data 92 represented in FIG. 9 so that it is similar to other sensed value sets for transversely aligned notes. The control circuit 24 of the invention is further operative to produce stored value sets which account for the angle of skew of the note.

When a note is skewed, the control circuit 24 is first operative to modify the raw sensed value set 92 by transposing the data to eliminate the data points near the leading edge that represent the absence of a note. This involves shifting the values on the right for each type of emitter as shown in FIG. 9, upwardly so that a sensed value set is created in which the sensed note data is present in each position in the 29 rows. Such a modified sensed value set is indicated 94 in FIG. 10.

As shown in FIG. 10, by shifting the raw values, a sensed value set which is a matrix of 24 by 29 sensed values is produced. Although the data was gathered from more than 29 of the transverse lines 90 when the bill was sensed, the modified sensed value set 94 "squares up" the sensed data so that it is a similar sensed value set to a transversely aligned note.

Such "squared up" data is usable by the control circuit for purposes of checking to see if the note sensed is the proper length. If after "squaring up" the raw data the data does not correspond to the length of a proper note, an appropriate indication of a suspect note is given.

As can be.appreciated from FIG. 8, the modification of raw sensed value set 92 to create sensed value set 94 does not result in a matrix of values that can be readily correlated with templates for notes that are aligned in the note path. This is because the test spots on skewed note 84 progressively move closer to the right edge of the note as the note passes. The rate at which the test spots on the note migrate toward the right is a function of the skew angle. To enable correlation of the modified sensed value set 94 with stored value sets, the control circuit 24 is operable to generate stored value sets for correlation that account for the angle of skew. This is graphically represented in FIG. 11.

FIG. 11 shows a modified sensed value set schematically indicated 96. This modified sensed value set 96 for purposes of this example can be envisioned as corresponding to a note like that in FIG. 8 where the note is skewed such that the left side in the frame of reference leads the right side. The control circuit is operable based on the calculated angle of skew of the note to take values from different sub-templates 68 in the master template 70 as graphically represented in FIG. 12.

As shown on the right in FIG. 11, the values in columns 98, 100, and 102 represent the templates similar to sub-templates 68 for a 0" horizontal offset, +1/8" horizontal offset, and 2/8" horizontal offset respectively as shown in FIG. 12. To generate a stored value set for correlation with modified sensed value set 96, the control circuit 24 is operative to select a series of values from the 0" offset template represented by column 98. The control circuit is then operative to "jump" so as to begin selecting values from column 100 which corresponds to the template 68 for the same note type transposed +1/8" from the 0" offset position. Further, after taking several values from column 100 the control circuit is operative to begin selecting values from column 102 which is representative of the template for the same note type disposed +2/8" from the 0" offset position.

The point where the control circuit 24 begins selecting values from the different templates is determined by the angle of skew. Stored value sets are generated for all positions of the note disposed within one-fourth inch of the zero reference in the note path in a similar manner.

As can be appreciated from the graphic representation in FIG. 11, to generate stored value sets that encompass the possible positions for a skewed note, the control circuit must abstract values from templates 68 for notes that are disposed more than one-fourth inch away from the zero offset position. As can now be appreciated from FIG. 12, this is why there are additional transverse offset templates 68 in each master template 70, even though the note is generally confined to an area plus or minus one-fourth inch from the zero offset position in the note path.

Figure 14:
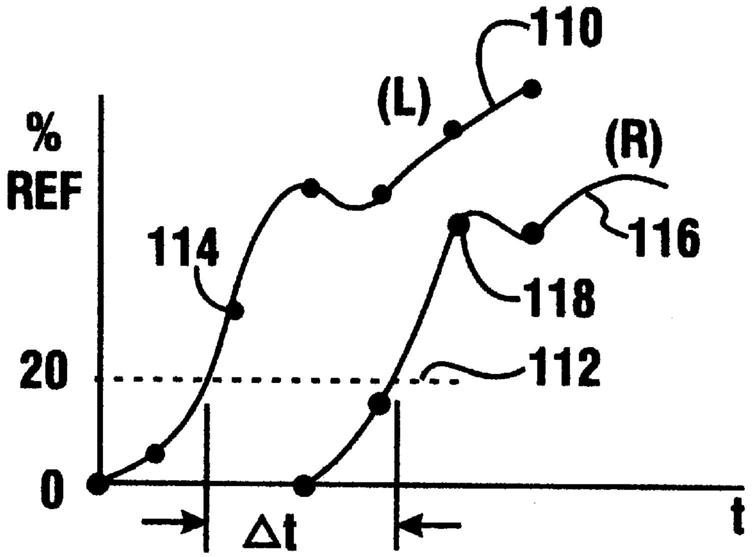
FIG. 14 is a graphical representation of reflectance signals obtained from transversely disposed spot sensing assemblies for a skewed note, which signals are used by the control circuit to determine an angle of skew.
Figure 15:
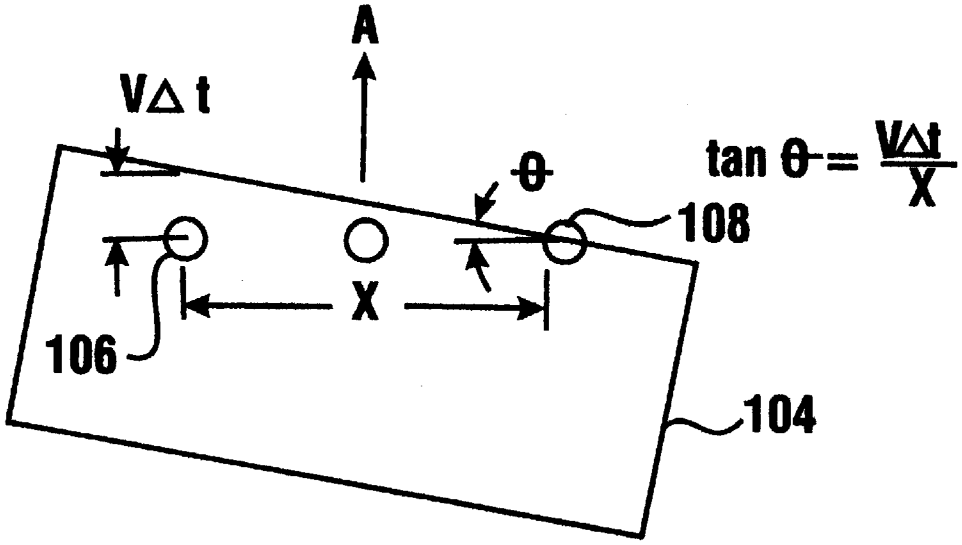
FIG. 15 is a schematic view of a skewed note and three transversely disposed spot sensing assemblies which correspond to the data graphically shown in FIG. 14.

The calculation of the skew angle which determines how the control circuit selects or abstracts values from the various templates to produce the stored value sets, is explained with reference to FIGS. 14 and 15. FIG. 15 shows a note 104 which is skewed in a manner similar to note 84 in FIG. 8. Note 104 has a left side leading a right side in a direction of note travel indicated by Arrow A. A spot sensing assembly 106 is positioned to the left as shown in FIG. 15. A spot sensing assembly 108 is positioned to the right as shown in FIG. 16. Both of the spot sensing assemblies are the same and similar to spot sensing assemblies 18 previously discussed.

Line 110 in FIG. 15 is representative of the reflectance values for a first emitter type to have produced radiation which is reflected from note 104 in an amount above a set threshold 112. This threshold is indicated as 20 percent in FIG. 14 which has been found through experimentation to be an acceptable value for this purpose when using U.S. currency notes. Of course other threshold values may be used. Data points 114 are representative of the actual reflectance values for the particular type emitter in spot sensing assembly 106 which was the first of the emitters to produce a reflectance value above the threshold. Line 110 is produced by a curve fitting process carried out by control circuit 24 using actual data points 114. This is done through execution of known curve fitting algorithms.

Line 116 is fitted by the control circuit to data points 118. Data points 118 are representative of the actual reflectance values from the emitter type in spot sensing assembly 108 that corresponds to the emitter that produced data points 114 in spot sensing assembly 106. By comparing the times at which the lines 110 and 116 each crossed the threshold 112, the skew angle of the note may be calculated. This difference in time in which reflectance values for the same emitter type in each of the spot sensing assemblies crossed the threshold is represented by the quantity At in FIG. 14.

The distance between spot sensing assemblies 106 and 108 is a known fixed quantity. Similarly the speed at which the note moves on the note transport is also known. As shown in FIG. 15 the angle of skew θ can be calculated by the following equation:

$$\tan\theta = \frac{v\Delta t}{x}$$

where:

θ is the angle of skew;

v is the velocity of the note in the note direction;

Δt is the difference in time between when the first emitter in a first spot sensing assembly senses the property of the note crossing the threshold, and when the corresponding emitter in the furthest disposed spot sensing assembly senses the property for that assembly crossing the threshold;

x is the distance between the spot sensing assemblies 106, 108 for which the time difference is evaluated.

As can be appreciated from the foregoing discussion, the angle of skew determines the points at which the control circuit begins selecting values from the templates to produce the stored value sets for comparison to the modified sensed value set. Of course, the angle of skew may be in either direction which necessitates that the control circuit be enabled to abstract values from templates 68 progressively in either transverse offset direction.

Referring again to FIG. 12 which shows the correlation sequence, step 74 is the de-skewing step in which the raw sensed value set from the spot sensing assemblies like set 92 in FIG. 9 is "squared up" to produce a modified sensed value set similar to set 94 in FIG. 10. When the data is skewed this step is done to produce the sensed value set 76 in FIG. 12 for purposes of correlation.

In step 66 the stored value sets are produced by the control circuit by abstracting data from the templates 68 in each master template 70, responsive to the skew angle detected. Thus, in the example represented in FIG. 12, values are abstracted from the 0" offset template 68 and the +1/8" offset template 68 to generate the stored value set 72 in the table of stored value sets the 0 vertical and 0" horizontal offset position.

As will be appreciated from the prior discussion, for the stored value sets 72 shown in the table above the 0 position, shifts between the two adjacent templates 68 occur one line of data higher with each −1/4 step upward in the table of stored value sets. Similarly, the shift between the templates would occur one data line downward for each +1/4 increment below the 0 vertical offset position in the table of stored value sets.

For example, to generate the stored value set 72 shown in the table having a 0 vertical offset and a horizontal offset position of −1/8", values on the corresponding lines highlighted in FIG. 12 in the 0" horizontal offset template, would instead be taken from the template having a horizontal offset of −1/8". Likewise, the lines shown highlighted in FIG. 12 in the +1/8"horizontal offset template, would instead be taken from the 0" horizontal offset template. Similarly, lines of data would be abstracted from these two templates by the control circuit 24 one data line upward from the values used to produce the 0, −1/8" stored value set, to generate the stored value set shown in the table at −1/4", −1/8". Abstracting values from the templates two data lines upward from the values used to generate the 0, −1/8" stored value set, provides the −2/4, −1/8 stored value set and so on.

Similarly abstracting values from the two templates used to produce the 0, −1/8" stored value set 72, provides the +1/4, −1/8"; +2/4, −1/8"; +3/4, −1/8" and +4/4, −1/8" stored value sets. This is done by abstracting values successively one data line lower than those abstracted to produce the prior stored value set.

Likewise, to produce the stored value set 72 in the 0 vertical offset, −2/8 horizontal offset position, the control circuit 24 abstracts values from the −2/8" and −1/8" horizontal offset templates 68, and so on. It can be appreciated that the selection process 51 executed by the control circuit 24 to generate the stored value sets for comparison with the sensed value set 76 can be visualized as a matter of shifting left-right among the templates 68 and up and down within the templates 68 to produce the various stored value sets 72 shown in the table positions in FIG. 12.

It should be remembered however, that even though values are abstracted or selected to produce the stored valued sets 72, all the selected values in a stored value set come from a single master template 70 which corresponds to a single note denomination having a particular orientation. As a result, when the values indicating levels of correlation are calculated and the highest one is found, the stored value set which produced this highest level of correlation will correspond to only one type identity.

Figure 13:
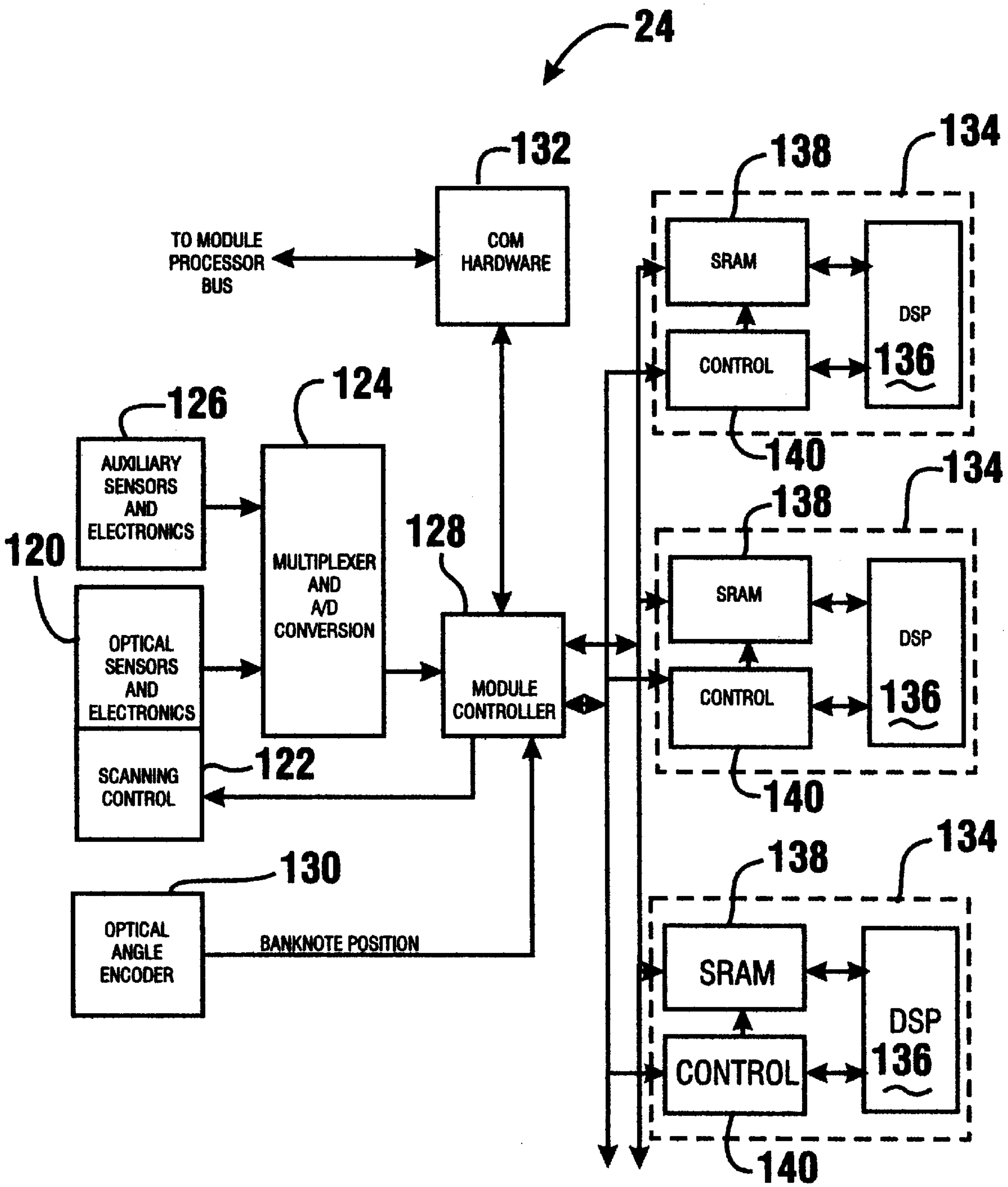
FIG. 13 is a schematic view of the control circuit of the preferred embodiment of the present invention.

The control circuit 24 of the preferred embodiment is schematically represented in FIG. 13. The control circuit 24 includes an optical sensors and electronics component 120. The optical sensors and electronics component includes the spot sensing assemblies 18 which produce the first and second signals which cause the control circuit 24 to generate the reflectance and transmission values.

The control circuit further includes a scanning control subassembly 122 which is in connection with the optical sensors and electronics component 120. The scanning control subassembly 122 actuates the emitters in the sequence to produce the synchronized first and second signals which correspond to each emitter type.

A multiplexer and analog to digital (A/D) converter component 124 is operative to receive the first and second signals from the spot sensing assemblies and to produce the raw reflectance and transmission values and to direct them to generate the sensed value set for each sensed note.

The control circuit 24 further includes an auxiliary sensors subassembly 126. The auxiliary sensors subassembly corresponds to the auxiliary sensors 28 previously discussed. These auxiliary sensors are preferably a type particularly tailored to the document or note type being sensed.

A module controller 128 is operative to receive data from and to control the operation of the other components of the system. The controller 128 is in connection with an angle encoder subassembly 130. The angle encoder subassembly 130 is operative to determine the skew angle of a note from the initial emitter signals as the note is sensed in the manner previously discussed. The control circuit 24 further includes a communications subassembly 132 which is operative to transmit signals to and from the controller 128. The communications subassembly transmits information to and from a larger system of which the apparatus is a part. It also delivers signals to and from input and output devices.

The controller 128 is in communication with a plurality of calculator modules 134. Each calculator module 134 includes a digital signal processor 136. Each digital signal processor 136 is in operative connection with a static random access memory 138. The memories 138 hold the stored values which are used to determine the level of correlation between the sensed value set and the generated stored value sets. Each memory 138 preferably holds a different group of the master templates 70.

Each calculator module 134 further includes a calculator controller 140. The calculator controllers are operative to produce the stored value sets from the templates in the memories 138. This is done based on angle of skew data provided by the controller 128. The calculator controllers are further operative to cause their associated digital signal processor to calculate the correlation values between the data values in the sensed value set and the stored value sets. The calculator controllers are further operative to control the associated digital signal processor to calculate the overall correlation coefficient for each stored value set, and to indicate the highest correlation value for the master templates handled by the particular calculator module.

The architecture of the preferred form of the control circuit 24 enables rapidly carrying out large numbers of calculations which are necessary to generate the stored value sets and to determine the correlation values for the sensed value set and all the stored value sets. The control circuit 24 has the advantage that each of the digital signal processors operates in parallel on the master templates stored in its associated memory. In addition, the processing capabilities of control circuit 24 may be increased by adding additional calculator and modules 134 to generate and correlate additional stored value sets. This enables correlating selective or additional sensed values with stored data.

In operation of the control circuit 24 the controller 128 operates the scanning control subassembly 122 to sequence the emitters in the spot sensing assemblies, which are included in the optical sensors and electronics subassembly 120. The first and second signals corresponding to reflectance and transmission from each emitter are delivered to the multiplexer and A/D converter 124 which delivers digital reflectance and transmission values corresponding to each emitter. The multiplexer and A/D converter 124 also receives signals from the auxiliary sensors and electronics subassembly 126 and delivers appropriate signals from these to the controller 128 as well.

The controller 128 is operable to sense a note entering into proximity with the spot sensing assemblies and to produce the raw sensed value set. The angle encoder subassembly 130 is operative to determine the angle of skew from the raw sensed value set and to deliver the information to the controller 128. The controller 128 is further operative to modify the raw sensed value set and to deliver the modified sensed value set and the angle of skew data to each of the calculator modules 134.

The controller 128 is operative to determine the note length from the modified sensed value set and compare it to the length for a standard note based on the number of test spots obtained. If the sensed note does not have the proper length a signal indicative thereof is generated, and further processing for that note is not conducted.

Each calculator module 134 is operative to generate stored value sets from the stored values in the master templates in memories 138 based on the angle of skew. The calculator modules are further operative to calculate the correlation coefficient values for the modified sensed value set and each of the generated stored value sets. Each calculator module stores and communicates to the controller 128 the calculated overall correlation coefficient value for each of the generated stored value sets. Each calculator module provides this information along with the data identifying the master template which was used to generate the stored value sets, to controller 128, along with other selected correlation data that the calculator modules may have been programmed to provide.

The controller is operative to receive the signals from each of the calculator modules and to determine which master template produced the highest level of correlation with the sensed value set. The controller module is further operative to determine if the correlation value which is the highest, is over a first threshold which indicates that the level of correlation is likely to be indicative of the note type associated with the particular master template.

The controller 128 then transmits signals to the communication subassembly 132 indicative of the note type identified or signals indicative that the note identified is suspect because its highest correlation level is not above the threshold.

In alternative embodiments, the controller 128 may test to determine if the correlation value exceeds other thresholds and transmit signals indicative of the fitness of the note for further use, or other signals relating to the genuineness or suspect character of the note. The communication subassembly 132 transmits signals to a communications bus connected to the apparatus of the present invention and to other devices and systems which are operative to further process the note or provide information about the note.

While in the preferred embodiment of the control circuit 24 is adapted to performing the calculating functions required for identifying the types of notes, in other embodiments other control circuit configurations may be used. Further, in the preferred form of the control circuit 24 the memories 38 which make up the data store may be programmed through the apparatus. This may be done in a setup mode as discussed by selectively positioning sample notes and moving them in controlled relation adjacent the spot sensing assemblies to gather the data necessary to produce the master templates.

This is done by having the module controller 128 control the operation of the note transport to move the sample notes at a speed which will enable gathering data at all the desired locations on the note. The controller 128 may also be programmed in the setup mode to receive signals indicative of the note type, and the transverse offset positions of the note used to provide template data in the memories 138 which comprise the data store.

Alternatively, the stored data may be produced in a different apparatus and loaded into the memories 138 through the controller 128 or from another source. In this approach stored values may be gathered from static analysis of sample notes.

In the preferred embodiment the optical sensors and electronic subassembly 120 further includes a compensator circuit that facilitates calibration of the spot sensing assemblies. In the preferred form of the invention the optical sensors and electronic subassembly is calibrated using a selected standard grade of white paper which is passed through the note transport adjacent to the spot sensing assemblies. In the calibration mode the optical sensors and electronic subassembly 120 is operative to adjust the amount of radiation generated by each of emitters to produce a preset output. This ensures that the level of radiation produced by each of the emitters is sufficient to correlate accurately with the stored value sets that are produced. Of course in other embodiments of the invention other types or reference material may be used for purposes of calibration.

Periodic calibration of the optical sensors and electronic subassembly 120 ensures that changes in the emitters over time or changes in the optical path due to accumulation of dust or other contaminants, will not adversely impact the accuracy of the apparatus. Due to the nature of light emitting diodes (LEDs) used for the emitters and the nature of the control circuitry which generally responds to relative values rather than absolute values, in the preferred embodiment calibration is required infrequently.

As can be appreciated from the foregoing description, the preferred embodiment of the apparatus of the present invention presents the advantage that it is capable of identifying notes that are presented in any orientation. It further operates to identify notes at high speed and without the need to have the notes precisely aligned or positioned with respect to a frame of reference.

The preferred embodiment of the present mvention further has the advantage that it is readily adaptable to different types of currency notes or other document types, and can be used to detect suspect or counterfeit notes. The preferred form of the present invention is also readily adaptable to different types of notes, and may be programmed to simultaneously identify notes from different countries which have different properties and which are different sizes. Further, due to the data available, the preferred form of the present invention may be programmed to analyze certain sensed values in greater detail to point out characteristics that may be associated with unsuitably worn or counterfeit notes.

The preferred embodiment of the present invention further presents the advantage that it is rapidly configured, programmed, readily calibrated and does not require frequent adjustment.

Thus, the new universal bank note denominator and validater apparatus of the present invention achieves the above stated objectives, eliminates difficulties encountered in the use of prior devices and systems, solves problems, and attains the desirable results described herein.

In the foregoing description, certain terms have been used for brevity, clarity, and understanding. However, no unnecessary limitations are to be implied therefrom because such terms are for descriptive purposes and are intended to be broadly construed. Moreover, the descriptions and illustrations given herein are by way of examples and the invention is not limited to the exact details shown or described.

In the following claims, any feature described as a means for performing a function shall be construed as encompassing any means capable of performing the recited function and shall not be deemed limited to the particular means shown as performing the recited function in the foregoing description, or mere equivalents.

Having described the features, discoveries, and principles of the invention, the manner in which it is constructed and operated and the advantages and useful results attained; the new and useful elements, arrangements, parts, combinations, systems, equipment, operations, methods, processes, and relationships are set forth in the appended claims.

I claim:

1. Apparatus for providing an indication of a note type associated with a note sensed by said apparatus, comprising:

a radiation source on first side of said note, wherein said radiation source directs radiation at a test spot on said note;

a first detector on the first side of said note, wherein said first detector outputs a first signal responsive to radiation reflected from said test spot to said first detector;

a second detector on a second opposed side of said note, wherein said second detector outputs a second signal responsive to radiation transmitted through said test spot to said second detector;

a circuit in operative connection with a data store, wherein said circuit is operative to activate said radiation source and to generate reflectance and transmission values responsive to said first and second signals respectively, wherein said circuit is operative to calculate at least one value representative of a level of correlation between said reflectance and transmission values and stored values in said data store corresponding to transmission and reflection properties adjacent said test spot for each of a plurality of known note types.

2. The apparatus according to claim 1 wherein said radiation source comprises a second plurality of radiation emitters, wherein each of said emitters generates radiation at a different wavelength, and wherein said circuit is operative to generate transmission and reflectance values corresponding to said first and second signals responsive to radiation produced by each emitter.

3. The apparatus according to claim 2 wherein said control circuit is operative to actuate each emitter separately.

4. The apparatus according to claim 2 wherein said emitters are arranged in generally surrounding relation of said first detector.

5. The apparatus according to claim 2 wherein said emitters emit radiation that generally spans the range of visible light.

6. The apparatus according to claim 2 wherein said emitters include emitters that emit visible and nonvisible radiation.

7. The apparatus according to claim 6 wherein said emitters include a generally red emitter, a generally blue emitter, a generally green emitter, and a generally infrared emitter.

8. The apparatus according to claim 1 wherein a sensed value set comprises said reflectance and transmission values, and wherein said stored values are arranged in stored value sets, and wherein said circuit is operative to calculate said level of correlation for the sensed value set and each stored value set.

9. The apparatus according to claim 8 wherein said radiation source comprises a plurality of radiation emitters, wherein each of said radiation emitters generates radiation at a generally different wavelength, and wherein said circuit is operative to generate transmission values responsive to said second signals produced responsive to radiation from each emitter, and wherein a transmission value corresponding to radiation from one emitter is included in a first portion of a sensed value set and a transmission value set corresponding to another emitter is included in a second portion of a sensed value set, and wherein said stored value sets includes first and second portions, and wherein a level of correlation is calculated between the first portions of the sensed and stored value sets and the second portions of the sensed and stored value sets respectively.

10. The apparatus according to claim 8 wherein said radiation source comprises radiation emitters, wherein each of said radiation emitters generates radiation at a generally different wavelength, and wherein said circuit is operative to generate reflectance values responsive to said first signals produced responsive to radiation from each emitter, and wherein a reflectance value corresponding to radiation from one emitter is included in a first portion of the sensed value set and a reflectance value corresponding to another emitter is included in a second portion of the sensed value set, and wherein each of said stored value sets include first and second portions, and wherein a level of correlation is calculated by the circuit between said first portions of said sensed and stored value sets and said second portions of said sensed and stored value sets respectively.

11. The apparatus according to claim 8 wherein said radiation source comprises a plurality of radiation emitters, and wherein each of said emitters produces radiation at a generally different wavelength, and wherein said circuit is operative to generate a reflectance value and a transmission value responsive to radiation produced by each emitter, and wherein each of said reflectance and transmission values is included in a sensed data set.

12. The apparatus according to claim 11 wherein said circuit is operative to activate each emitter separately from the others, wherein reflectance and transmission values for each emitter are generated simultaneously.

13. The apparatus according to claim 1 and further comprising a note transport, and wherein said note transport relatively moves said note and said first and second detectors, whereby as a result of said relative movement said note includes a second plurality of discrete test spots, and wherein said circuit generates reflectance and transmission values for each of said test spots, and wherein said stored values correspond to transmission and reflectance properties adjacent each of said test spots for each of said plurality of known note types.

14. The apparatus according to claim 13 wherein said radiation source comprises a third plurality of radiation emitter types, each emitter type generating radiation at a generally different wavelength, and wherein said circuit is operative to activate each emitter type separately and in a sequence adjacent to each of said second plurality of test spots.

15. The apparatus according to claim 14 wherein said second plurality of transmission values corresponding to one first emitter is included in a first portion of a sensed data set, and wherein said data store includes a fourth plurality of first stored value sets each having a first portion corresponding to transmission properties adjacent each of said test spots for each of said plurality of known note types, and wherein said circuit is operative to calculate the value representative of the level of correlation between said first portion of said sensed value set and the first portions of each of said fourth plurality of stored value sets.

16. The apparatus according to claim 14 wherein said second plurality of reflectance values corresponding to one first emitter is included in a first portion of a sensed data set, and wherein said data store includes a fourth plurality of first stored value sets each having a first portion corresponding to reflectance properties adjacent each of said test spots for each of sai d plurality of known note types, a nd wh erein said circuit is operative to calculate the value representative of the level of correlation between the first portion of said sensed value set and the first portions of each said fourth plurality of stored value sets.

17. The apparatus according to claim 15 wherein said note transport moves said note in a note direction, and wherein said first an d second detectors and third plurality of emitters comprise a spot sensing assembly, and wherein said apparatus comprises a fifth plurality of spot sensing assemblies generally spaced transversely of said note direction, and wherein said first portion of said sensed data set includes transmission values corresponding to said one first emitter in one of said fifth plurality of spot sensing assemblies, sai d transmission values corresponding to radiation transmitted through said note at each of the test spots adjacent one of said fifth plurality spot sensing assemblies during relative movement of said note by said note transport.

18. The apparatus according to claim 15 wherein said note transport moves said note in a note direction, and wherein said first and second detectors and said third plurality of emitters comprise a spot sensing assembly, and wherein said apparatus further comprises a fifth plurality of spot sensing assemblies generally space transversely of said note direction, and wherein said first portion of said sensed data set includes reflectance values corresponding to said one first emitter and one of said fifth plurality of spot sensing assemblies, said reflectance values corresponding to radiation reflected from said not e at each of the test spots adjacent one of said fifth plurality of spot sensing assemblies during relative movement of said note by said note transport.

19. The apparatus according to claim 15 wherein said circuit is operative to generate stored value sets, wherein said stored value sets comprise data values from said data store, wherein said stored value sets comprise transmission values for each of said plurality of known note types from each of said emitters adjacent each of said second plurality of test spots.

20. The apparatus according to claim 16 wherein said circuit is operative to generate stored value sets, wherein said stored value sets comprise stored values from said data store, and wherein said stored value sets comprise reflectance values for each of said plurality of known note types from each of said emitters adjacent each of said second plurality of test spots.

21. The apparatus according to claim 19 wherein said second plurality of test spots are each generally equally spaced from one another, and wherein said data store includes data values corresponding with transmission values for each of said plurality of known note types spaced intermediate of each of said test spots on said note, whereby a location of an edge of said note need not be determined to identify said note type.

22. The apparatus according to claim 20 wherein said second plurality of test spots are generally equally spaced from one another, and wherein said data store includes data values corresponding with reflectance values for each of said plurality of known note types spaced intermediate of each of said test spots on said note, whereby a location of an edge of said note need not be detected to identify said note type.

23. The apparatus according to claim 19 wherein said note transport moves said note relative to said detectors in a note direction, and wherein said data store includes data values corresponding to transmission values for each of said plurality of known note types displaced from said note at least one increment in a direction transverse to said note direction, whereby said note need not be aligned transversely in said transport for said note type to be identified.

24. The apparatus according to claim 20 wherein said note transport moves said note relative to said detectors in a note direction, and wherein said data store includes data values corresponding with reflectance values for each of said plurality of known note types displaced from said note at least one increment in a direction transverse to said note direction, whereby said note need not be aligned transversely in said note transport for said note type to be identified.

25. The apparatus according to claim 21 wherein said note transport moves said note relative to said detectors in a note direction, and wherein said data store includes data values corresponding with transmission values for each of said plurality of known note types displaced from said note at least one increment in a direction transverse to said note direction, whereby notes need not be aligned in said transport to have their types identified.

26. The apparatus according to claim 22 wherein said note transport moves said note relative to said detectors in a note direction, and wherein said data store includes data values corresponding with reflectance values for each of said plurality of known note types displaced from said note at least one increment in a direction transverse to said note direction, whereby notes need not be aligned in said transport to have their note types identified.

27. The apparatus according to claim 2 wherein said first detector, second detector, and said second plurality of radiation emitters comprise a spot sensing assembly, and wherein said apparatus comprises a note transport, and wherein said note transport moves said note relative to said spot sensing assembly in a note direction, and wherein said apparatus comprises a fifth plurality of spot sensing assemblies, and wherein said spot sensing assemblies are spaced apart transversely relative to said note direction.

28. The apparatus according to claim 27 wherein said circuit activates each of said emitters in each of said spot sensing assemblies a sixth plurality of times as said note relatively moves in adjacent relation to said spot sensing assemblies.

29. The apparatus according to claim 28 wherein said circuit activates said emitters in accordance with a timed sequence.

30. The apparatus according to claim 29 wherein said circuit activates said emitters to cause generation of said transmission and reflectance values for radiation emitted by each emitter in each of the spot sensing assemblies at a grid of test spots on said note.

31. The apparatus according to claim 30 wherein emitters of a type generate radiation at generally the same wavelength, and wherein said transmission or reflectance values corresponding to radiation from one type of emitter at each of said test spots in a portion of said grid comprise a first portion of a sensed data set, and wherein said data store includes stored values wherein said circuit generates a stored value set having a first portion corresponding with said transmission or reflectance values at said test spots in said grid corresponding to said one type emitter for each of said plurality of known note types.

32. The apparatus according to claim 31 wherein said first portion of said sensed value set comprises values designated (x) and wherein said first portion of said stored value sets comprises stored values designated (y), and wherein said circuit is operative to calculate the value representative of the level of correlation between said first portion of said sensed value set and said first portion of said second value sets in accordance with the following formula:

$$C_{xy} = \frac{\sum (x_i - \mu_x)(y_i - \mu_y)}{\sigma_x \sigma_y}$$

where:

$C_{xy}$ is a correlation coefficient;

$X_i$ is a value in the first portion of the sensed value set; the values ranging from one to n, n being the total number of values in the first portion of the sensed value set;

$y_i$ is the value corresponding to the position of $x_i$ in the first portion of the stored value set;

$\mu_x$ is the average of the values in the first portion of the sensed value set.

$\mu_y$ is the average of the values in the first portion of the stored value set;

$\sigma_x$ is the standard deviation of the values in the first portion of the sensed value set; and $\sigma_y$ is the standard deviation of the values in the first portion of the stored value set.

33. The apparatus according to claim 32 wherein said circuit is operative to generate a sensed value set having a first portion including reflectance values generated responsive to radiation from each of said types of emitter, and to calculate a value representative of a level of correlation with the first portion of each of a seventh plurality of stored value sets corresponding to reflectance values from each of said types of emitters.

34. The apparatus according to claim 32 wherein said circuit is operative to generate a sensed value set having a first portion including transmission values generated responsive to radiation from each of said types of emitter, and to calculate a value representative of a level of correlation with the first portion of each of a seventh plurality of stored value sets corresponding to transmission values from each of said types of emitter.

35. The apparatus according to claim 34 wherein said stored value sets include reflectance or transmission values corresponding to each of said plurality of known note types shifted in the note direction from said note.

36. The apparatus according to claim 34 wherein said stored value sets include transmission or reflectance values corresponding to each of said plurality of known note types shifted in a direction transverse of said note direction from said note.

37. The apparatus according to claim 1 wherein said radiation source comprises a second plurality of radiation emitters, said emitters including a third plurality of emitter types, wherein each type of emitter generates radiation at a wavelength different from the other types, and wherein all of said emitters direct radiation at one test spot on said note, and wherein at least one of said first or second detectors is positioned adjacent said test spot.

38. The apparatus according to claim 37 wherein said circuit is operative to generate a sensed value set including a first portion corresponding to either transmission or reflectance values for one of said emitter types, and wherein said circuit is operative to generate stored value sets including said stored values, and wherein said stored value sets each include a first corresponding portion wherein said each said first corresponding portion of a stored value set corresponds to said transmission or reflectance values for said one type emitter and a known note type, and wherein said circuit is operative to calculate said value representative of level of correlation between said first portion of said sensed value set and said first corresponding portion of each stored value set.

39. The apparatus according to claim 38 wherein said circuit is operative to produce a sensed value set including a fourth plurality of portions, each portion corresponding to reflectance or transmission values from each of said third plurality of emitter types, and wherein said circuit is operative to generate stored value sets, each said stored value set including said fourth plurality of corresponding portions corresponding to said transmission or reflectance values for each of said emitter types and a known note type, and wherein said circuit calculates said value representative of a level of correlation for each portion of the sensed value set and each corresponding portion of each stored value set.

40. The apparatus according to claim 39 wherein the control circuit is operative to calculate said value representative of the level of correlation between the sensed value set and each stored value set, by combining values representative of the level of correlation between the corresponding portions of the sensed value set and each stored value set.

41. The apparatus according to claim 39 wherein said circuit is operative to calculate a value representative of the overall level of correlation between the sensed value set and a stored value set by multiplying together values representative of a level of correlation of reflectance values in corresponding portions of the sensed value set and the stored value set to obtain a reflectance product which corresponds to an overall level of correlation for reflectance between the sensed value set and the stored value set, wherein said circuit is further operative to multiply together values representative of the level of correlation of the transmission values in corresponding portions of the sensed value set and the stored value set to obtain a transmission product which corresponds to an overall level of correlation for transmission between the sensed value set and the stored value set, and wherein said control circuit is further operative to produce the value representative of the overall level of correlation between the sensed value set and the stored value set by multiplying the transmission product and the reflectance product together.

42. The apparatus according to claim 1 wherein said note has a position and wherein said stored values include data representative of templates of stored values corresponding to reflectance and transmission values for each of said plurality of known note types in said note position and in positions disposed from said note position.

43. The apparatus according to claim 42 wherein said note extends generally in a plane and wherein said templates correspond to said known note types shifted from said note position in a first direction in said plane.

44. The apparatus according to claim 43 wherein said templates correspond to said known note types shifted from said note position in a direction transverse of said first direction.

45. The apparatus according to claim 40 wherein said circuit is operative to generate a signal corresponding to a stored value set providing the value representative of the highest level of correlation with said sensed value set, whereby said signal is indicative of a particular note type.

46. The apparatus according to claim 45 wherein said circuit is operative to compare said value representative of said highest level of correlation to a stored threshold value, and wherein said circuit is operative to provide a second signal when said value representative of the highest level correlation does not exceed said stored threshold value.

47. The apparatus according to claim 1 wherein said stored values correspond to each of said plurality of note types in a second plurality of angular positions.

48. The apparatus according to claim 44 wherein said stored value sets correspond to each of said known note types shifted from said note position in a second plurality angular directions.

49. The apparatus according to claim 1 wherein said apparatus comprises means for sensing an angle of skew of said note, and wherein said circuit is operative to select said stored values used for calculating said value representative of the level of correlation from said data store responsive to said sensed angle of skew.

50. The apparatus according to claim 27 wherein said control circuit is operative to determine a skew angle of said note responsive to said spot sensing assemblies first sensing a transmission or reflectance property of said note at different times, and wherein said stored values used for calculating said value representative of a level of correlation are selected by said circuit responsive to said skew angle.

51. The apparatus according to claim 50 wherein said skew angle is calculated by said control circuit responsive to a transmission or reflectance value from a first emitter type in a first spot sensing assembly reaching a threshold value, and said transmission or reflectance value for said first emitter type in a second spot sensing assembly transversely spaced from said first spot sensing assembly reaching said threshold value a time thereafter.

52. The apparatus according to claim 51 wherein said control circuit calculates said skew angle as a ftnction of said time, a distance separating said first and second spot sensing assemblies, or a speed at which said transport moves said note.

53. The apparatus according to claim 47 wherein said circuit is operative to generate stored value sets, wherein said value representative of a level of correlation is calculated between said reflectance and said transmission values and said stored value sets, and wherein said circuit is operative to selectively include stored values from said data store in said stored value sets responsive to said skew angle.

54. The apparatus according to claim 53 wherein said data store includes data representative of at least one template corresponding to each one of said plurality of known note types, and wherein said template includes values corresponding to transmission and reflectance values for said corresponding note type at a generally zero skew angle, and wherein said circuit generates said stored value set from said template responsive to said skew angle.

55. The apparatus according to claim 54 wherein said data store includes at least one said template for each of one of said plurality known note types, wherein said template includes stored values corresponding to said reflection and transmission values for said note type at a third plurality of transverse positions.

56. The apparatus according to claim 55 wherein said apparatus further comprises a transport for relatively moving said note in a note direction relative to said radiation source and said detectors, and wherein said relatively moving note includes a fourth plurality of test spots, and wherein each of said test spots is separated from each adjacent test spot in said note direction by a spot spacing distance, and wherein each said template includes stored values corresponding to said reflectance and transmission values for each one of said known note types in uniform increments smaller than said spot spacing distance.

57. The apparatus according to claim 56 wherein said increments are generally one-fourth of said spot spacing distance.

58. The apparatus according to claim 56 wherein said data store includes for each one of said plurality of note types a master template, and wherein each said master template comprises a fifth plurality of sub-templates corresponding to one note type, and wherein each of said master templates corresponds to said note type at a zero skew angle, and wherein each of said sub-templates in one of the master templates corresponds to transmission and reflectance values for said one note type disposed from an adjacent sub-template in a direction transverse of said note direction, and wherein said circuit is operative to include values in said stored value sets for said one note type from said sub-templates in the one master template responsive to said skew angle.

59. The apparatus according to claim 1 wherein said circuit comprises a digital signal processor, and wherein said data store includes data representative of at least one template corresponding to a known note type and having said stored values therein corresponding to said note type in a second plurality of note positions, and wherein said stored values comprising said template are accessed by said digital processor of said circuit.

60. The apparatus according to claim 59 wherein said circuit includes a third plurality of digital signal processors, and wherein each of said digital signal processors accesses stored values in templates associated with one particular digital signal processor.

61. The apparatus according to claim 60 wherein said circuit is operative to calculate a correlation value corresponding to a highest level of correlation between said sensed reflectance and transmission values for said note and the stored values in each one of said templates.

62. The apparatus according to claim 61 wherein said circuit is further operative to generate a signal representative of said highest of said correlation values among all of said templates, whereby said signal is indicative that the sensed note has a highest level of correlation with stored values for a particular note type.

63. The apparatus according to claim 61 wherein said correlation value is a function of a transmission correlation value and a reflectance correlation value, wherein said function is calculated by said circuit, and wherein said transmission correlation value is calculated by said circuit and is indicative of a level of correlation between said sensed transmission values and stored values in said template corresponding to transmission values, and wherein said reflectance correlation value is calculated by said circuit and is indicative of a level of correlation between said sensed reflectance values and said stored values in said template corresponding to reflectance values.

64. The apparatus according to claim 63 wherein said radiation source comprises a fourth plurality of emitter types, wherein each emitter type emits radiation at a generally different wavelength from other emitter types, and wherein said circuit is operative to calculate said transmission correlation value as a combination of calculated emitter type correlation values representative of levels of correlation between transmission values from said note for each one of said emitter types, and stored values in said templates corresponding to each one of said emitter types.

65. The apparatus according to claim 63 wherein said radiation source comprises a fourth plurality of emitter types and wherein said circuit is operative to calculate said reflectance correlation value responsive to a level of correlation between said reflectance values from said note for each one of said emitter types, and stored values in said templates corresponding to each one of said emitter types.

66. The apparatus according to claim 64 wherein said circuit is operative to generate reflectance and transmission values for a fifth plurality of generally linearly aligned test spots, whereby said test spots extend in a line on said note, and wherein said note reflectance and transmission correlation values are calculated by said circuit for all test spots in said line for each one of said emitter types by calculating a value representative of a level of correlation with stored values in each of said templates corresponding to said line and emitter type.

67. The apparatus according to claim 66 wherein said circuit is operative to generate reflectance and transmission values corresponding to a sixth plurality of lines of test spots, and wherein said transmission and reflectance correlation values are calculated by said circuit from stored values in each said template corresponding to each said line of test spots and emitter type.

68. A method for determining a type associated with a note, comprising the steps of:

illuminating a test spot on said note with a radiation source;

sensing with a first detector radiation reflected from said test spot and generating a first signal responsive to said reflected radiation sensed;

sensing with a second detector radiation transmitted through said test spot and generating a second signal responsive to said transmitted radiation sensed;

calculating with a circuit a value representative of a level of correlation between said first and second signals and stored values in a data store corresponding to transmission and reflectance properties adjacent said test spot for a plurality of known note types.

69. The method according to claim 68 wherein said stored values are arranged in stored value sets, each said stored value set corresponding to one of said known note types, and further comprising the step of providing a signal indicative of the known note type having the highest value representative of the level of correlation with said first and second signals.

70. The method according to claim 68 wherein said illuminating step comprises illuminating said test spot sequentially with a second plurality of types of radiation emitters, each emitter type emitting radiation at a generally different wavelength than other emitter types.

71. The method according to claim 70 wherein in said first sensing step said second plurality of first signals are generated each corresponding to an emitter type, and wherein in said calculating step a first correlation value is calculated representative of a level of correlation between each of said first signals for said note and first stored values corresponding to reflectance from said emitter type for each of said plurality of known note types.

72. The method according to claim 71 wherein in said second sensing step said second plurality of second signals are generated each corresponding to an emitter type, and wherein in said calculating step a second correlation value is calculated representative of a level of correlation between each of said second signals for said note and second stored values corresponding to transmission from said corresponding emitter type through each of said plurality of known note types.

73. The method according to claim 72 wherein said calculating step comprises calculating said first and second correlation values for said note and each of said plurality of known note types, which said value representative of a level of correlation is calculated as a function of said first and second correlation values.

74. The method according to claim 72 and further comprising the step of conducting said first and second sensing steps adjacent a third plurality of test spots on said note, said test spots arranged in a grid, and wherein said first and second stored values are representative of transmission and reflectance properties adjacent each of said test spots in said grid for each of said known note types, and said values are stored as data representative of a template in said data store, and wherein said calculating step comprises generating with said circuit a stored value set including values from each template, and calculating said value representative of a level of correlation as a function of values corresponding to said first and second signals for each of said test spots on said note and said first and second values in each of said stored value sets.

75. The method according to claim 68 wherein said illuminating step comprises illuminating a second plurality of test spots on a grid on said note, each test spot being sequentially illuminated by a third plurality of types of radiation emitters, each type of radiation emitter producing radiation at a generally different wavelength from other types of emitters, and wherein said first and second sensing steps comprise generating first and second signals at each of said second plurality of test spots for each of said third plurality of emitters, and wherein said calculating step comprises generating with said circuit reflectance and transmission values responsive to each of said first signals and second signals respectively, and wherein said reflectance and transmission values are placed in a sensed value set, and wherein said calculating step further comprises generating with said circuit stored value sets comprising stored values from said data store, and wherein said stored value sets correspond to transmission and reflectance values for each of said plurality of known note types, and wherein said value representative of a level of correlation is calculated for said sensed value set and each of said stored value sets.

76. The method according to claim 75 and prior to said illuminating step further comprising the step of storing in said data store stored values corresponding to said transmission and reflectance values for each emitter type adjacent each test spot for each of said known note types disposed in a fourth plurality of spatial positions.

77. The method according to claim 68 and prior to said calculating step further comprising the step of determining a skew angle of said note from said first and second signals, and wherein in said calculating step said stored values are selected from said data store responsive to said skew angle, and wherein said value representative of a level of correlation is calculated by said.circuit using said selected values.

* * * * *